(12) United States Patent
Chao et al.

(10) Patent No.: US 10,977,815 B1
(45) Date of Patent: Apr. 13, 2021

(54) STRUCTURED LIGHT EYE-TRACKING

(71) Applicant: Facebook Technologies, LLC, Menlo Park, CA (US)

(72) Inventors: Qing Chao, Redmond, WA (US); Michael Hall, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 32 days.

(21) Appl. No.: 16/025,837

(22) Filed: Jul. 2, 2018

(51) Int. Cl.
*G06T 7/521* (2017.01)
*G06F 3/01* (2006.01)
*G02F 1/11* (2006.01)
*G02F 1/125* (2006.01)
*H04N 5/33* (2006.01)

(52) U.S. Cl.
CPC .............. *G06T 7/521* (2017.01); *G02F 1/113* (2013.01); *G02F 1/125* (2013.01); *G06F 3/013* (2013.01); *H04N 5/33* (2013.01); *G06T 2207/10028* (2013.01); *G06T 2207/10048* (2013.01)

(58) Field of Classification Search
CPC ......... G06T 7/5221; G06T 2207/10028; G06T 2207/10048; G02F 1/113; G02F 1/125; G06F 3/013; H04N 5/33; A61B 3/00; A61B 3/145; G06K 9/00597; G06K 9/00604; G06K 9/0061
See application file for complete search history.

(56) References Cited

U.S. PATENT DOCUMENTS

| | | | | |
|---|---|---|---|---|
| 6,398,365 | B1 * | 6/2002 | Takahashi | G02B 5/203 348/E9.027 |
| 2002/0126332 | A1 * | 9/2002 | Popovich | G02B 5/32 359/15 |
| 2003/0179423 | A1 * | 9/2003 | Endo | G02F 1/133621 359/10 |
| 2006/0008195 | A1 * | 1/2006 | Tsunoda | G02F 1/125 385/7 |
| 2007/0082196 | A1 * | 4/2007 | Ali | C09J 7/21 428/352 |
| 2013/0021226 | A1 * | 1/2013 | Bell | G02B 27/017 345/8 |
| 2013/0088723 | A1 * | 4/2013 | Feldkhun | G01B 9/02041 356/498 |
| 2016/0026253 | A1 * | 1/2016 | Bradski | H04N 13/344 345/8 |
| 2017/0094265 | A1 * | 3/2017 | Mullins | G02B 27/0179 |
| 2017/0177075 | A1 * | 6/2017 | Zhang | G02B 27/0093 |
| 2017/0192499 | A1 * | 7/2017 | Trail | G06F 3/013 |
| 2017/0328826 | A1 * | 11/2017 | Diebold | G06T 7/0012 |
| 2018/0074457 | A1 * | 3/2018 | Jolly | G02F 1/332 |
| 2018/0227567 | A1 * | 8/2018 | Chao | H04N 13/337 |
| 2018/0341127 | A1 * | 11/2018 | Frank | G03H 1/2294 |
| 2018/0375490 | A1 * | 12/2018 | Smalley | G02F 1/125 |

* cited by examiner

Primary Examiner — Alexander Gee
(74) Attorney, Agent, or Firm — Weaver Austin Villeneuve & Sampson LLP

(57) ABSTRACT

A method includes generating, by an illumination source, an optical beam and coupling the optical beam into an acousto-optic device. The acousto-optic device generates structured light from the coupled optical beam by diffracting the optical beam into at least two interfering optical beams. The interfering optical beams are then used to illuminate a surface of an eye of a user of a display for use in eye-tracking.

20 Claims, 15 Drawing Sheets

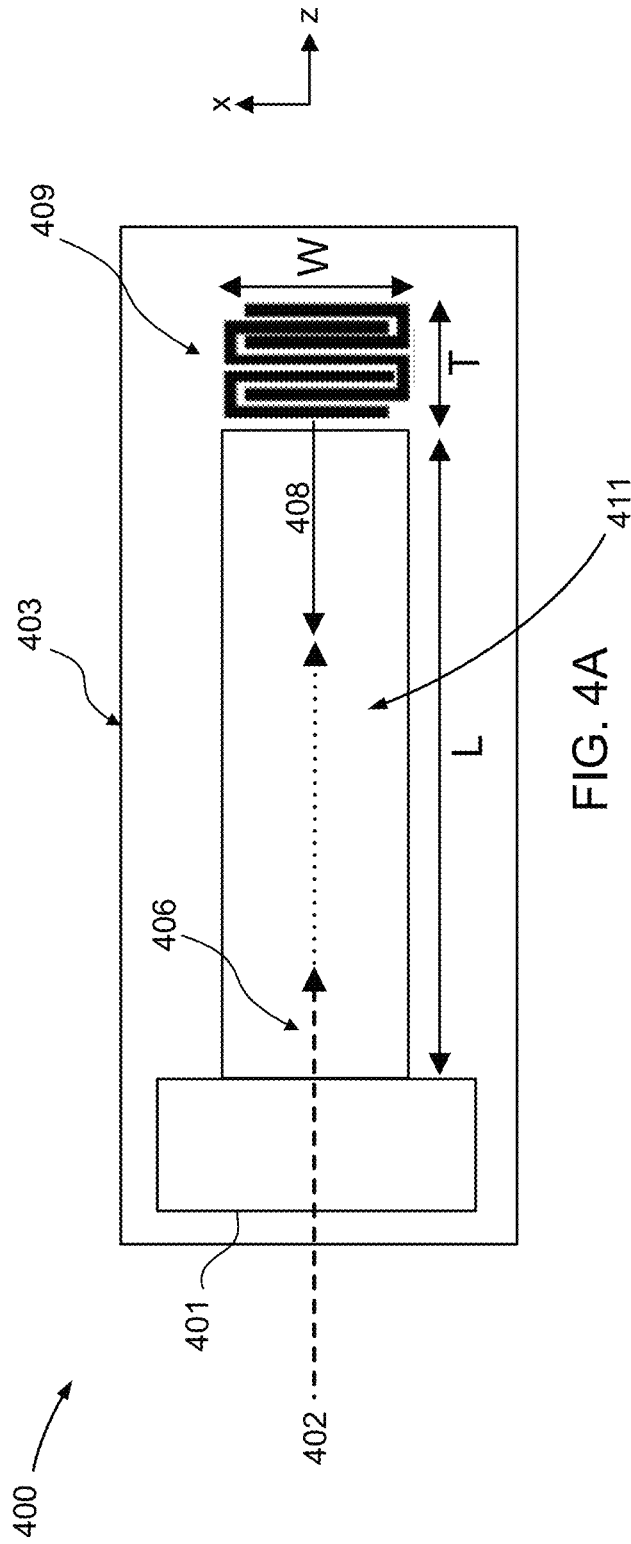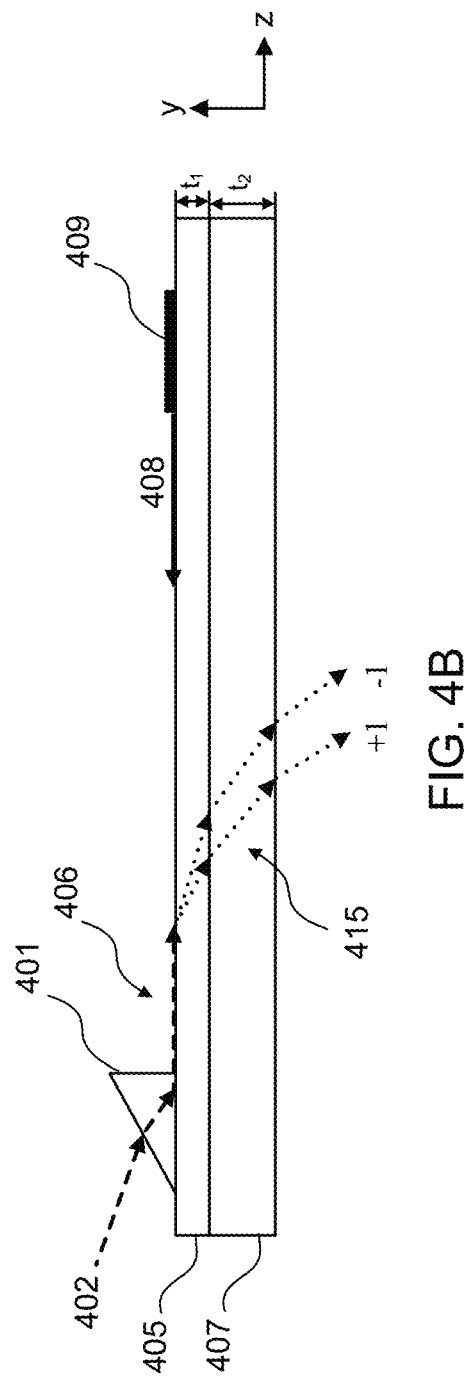
FIG. 4A
FIG. 4B 810
820

STRUCTURED LIGHT EYE-TRACKING

BACKGROUND

An artificial reality system generally includes a display panel configured to present artificial images that depict objects in an environment. The display panel may display virtual objects or combine real objects with virtual objects, as in virtual reality (VR), augmented reality (AR), or mixed reality (MR) applications. To provide a more immersive artificial reality experience, some artificial reality systems may include a dedicated input/output interface for receiving user inputs, such as hand and/or finger movements. Additionally or alternatively, artificial reality systems can employ eye-tracking systems that can track the gaze of a user. The system may therefore employ gaze direction information and/or information gained from handheld peripheral input/output devices to provide a more immersive experience for the user. For example, eye-tracking can be used for foveated imaging, foveated transmission of image data, alertness monitoring, etc.

Existing eye-tracking systems may use light sources (e.g., infrared light sources) positioned at the periphery of the user's field of view to illuminate the eye. The light illuminating the eye may be specularly reflected by a surface of the user's eye, e.g., the corneal surface, resulting in "glints" in a captured image of the eye. The position (e.g., gaze direction or rotation position) of the eye may be determined based on the location of the glints relative to a known feature of the eye (e.g., center of the pupil) in the captured image.

Although glint tracking can yield accuracy on the order of 1 degree after calibration, such accuracy is difficult to achieve across the wide variety of human eye shapes and sizes. One problem is that depth data obtained from glints is generally sparse, for example, because the technique employs only a small number of IR point sources arranged in specific locations on the surface of the eye only a correspondingly small number of depth points are measured. Because only a few points on the surface of the eye are sampled by the glints, any depth computation may rely on an idealized model of the eye that may not be valid for all users. In addition, for AR devices, in which the display is transparent and the device is expected to undergo all-day, untethered use in a stylish form factor, there are more stringent constraints on mechanical layout, size, weight, and power. Furthermore, for AR devices operating outdoors, reflections of the real world environment will result in several glint-like reflections that may be confusing to, or misinterpreted by, eye-tracking algorithms.

In view of the above, there remains a need for eye-tracking systems that can more accurately map the depth profile of the surface of a user's eye and can also be effectively deployed in AR systems.

SUMMARY

The present disclosure generally relates to systems and methods for eye-tracking using structured light.

In some embodiments, a system includes a display having a light emitting surface configured to emit light toward an eye of a user and a structured light generator configured to illuminate a surface of the eye of the user with structured light. The structured light generator includes an illumination source configured to emit an optical beam and an acousto-optic device that is configured to generate the structured light from the optical beam by diffracting the optical beam into at least two interfering optical beams. The acousto-optic device can be further configured to project an interference pattern formed by the at least two interfering optical beams onto the surface of the eye of the user.

In some embodiments, the system further includes an imaging device that is configured to capture one or more images of the interference pattern that is projected onto the surface of the eye. One or more processors can be configured to determine a depth image of the eye based on the one or more images.

In some embodiments, the acousto-optic device that is configured to generate the structured light from the optical beam by diffracting the optical beam into at least two interfering optical beams is a surface acoustic wave (SAW) device. The SAW device can be a layered device that includes a waveguide layer that guides and diffracts the optical beam and a substrate layer. The waveguide layer can be disposed on the substrate layer. In some embodiments, the substrate layer may be transparent to visible light.

In some embodiments, the SAW device further includes a transducer that is acoustically coupled to the waveguide layer. In response to a drive signal, an acoustic wave from the transducer can generate a dynamic diffraction grating that diffracts the optical beam into the at least two interfering optical beams.

In some embodiments, an interface between the waveguide layer and the substrate layer is configured to reflect the at least two interfering optical beams before the at least two interfering optical beams are projected onto the surface of the eye of the user.

In some embodiments, the interface between the waveguide layer and the substrate layer is configured to transmit the at least two interfering optical beams before the at least two interfering optical beams are projected onto the surface of the eye of the user.

In some embodiments, the system further includes a controller that is configured to generate a drive signal that, at least in part, determines at least one of a phase or a frequency of the interference pattern. The controller can also be configured to provide the drive signal to the structured light generator.

In some embodiments, the light emitting surface is a transparent display disposed in front of the eye of the user and the acousto-optic device is disposed on the transparent display within a field of view of the eye of the user.

In some embodiments, the light emitting surface is an opaque display disposed in front of the eye of the user and the acousto-optic device is disposed on the opaque display and is within a field of view of the eye of the user.

In some embodiments, a method includes emitting, from a display, display light toward an eye of a user and illuminating, by a structured light generator, a surface of the eye of the user with structured light. The illuminating includes emitting, by an illumination source, an optical beam; generating, by an acousto-optic device, the structured light from the optical beam by diffracting the optical beam into at least two interfering optical beams; and projecting, by the acousto-optic device, an interference pattern formed by the at least two interfering optical beams onto the surface of the eye.

In some embodiments, the method further includes capturing, by an imaging device, one or more images of the interference pattern that is projected onto the surface of the eye and determining, by one or more processors, a depth image of the eye based on the one or more images.

In some embodiments, the method further includes generating, by a transducer that is acoustically coupled to the waveguide layer, an acoustic wave that generates a dynamic diffraction grating that diffracts the optical beam into the at least two interfering optical beams.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures:

FIGS. 4A-4B illustrate a chip-scale surface acoustic wave device according to certain embodiments;

DETAILED DESCRIPTION

Figure 1:
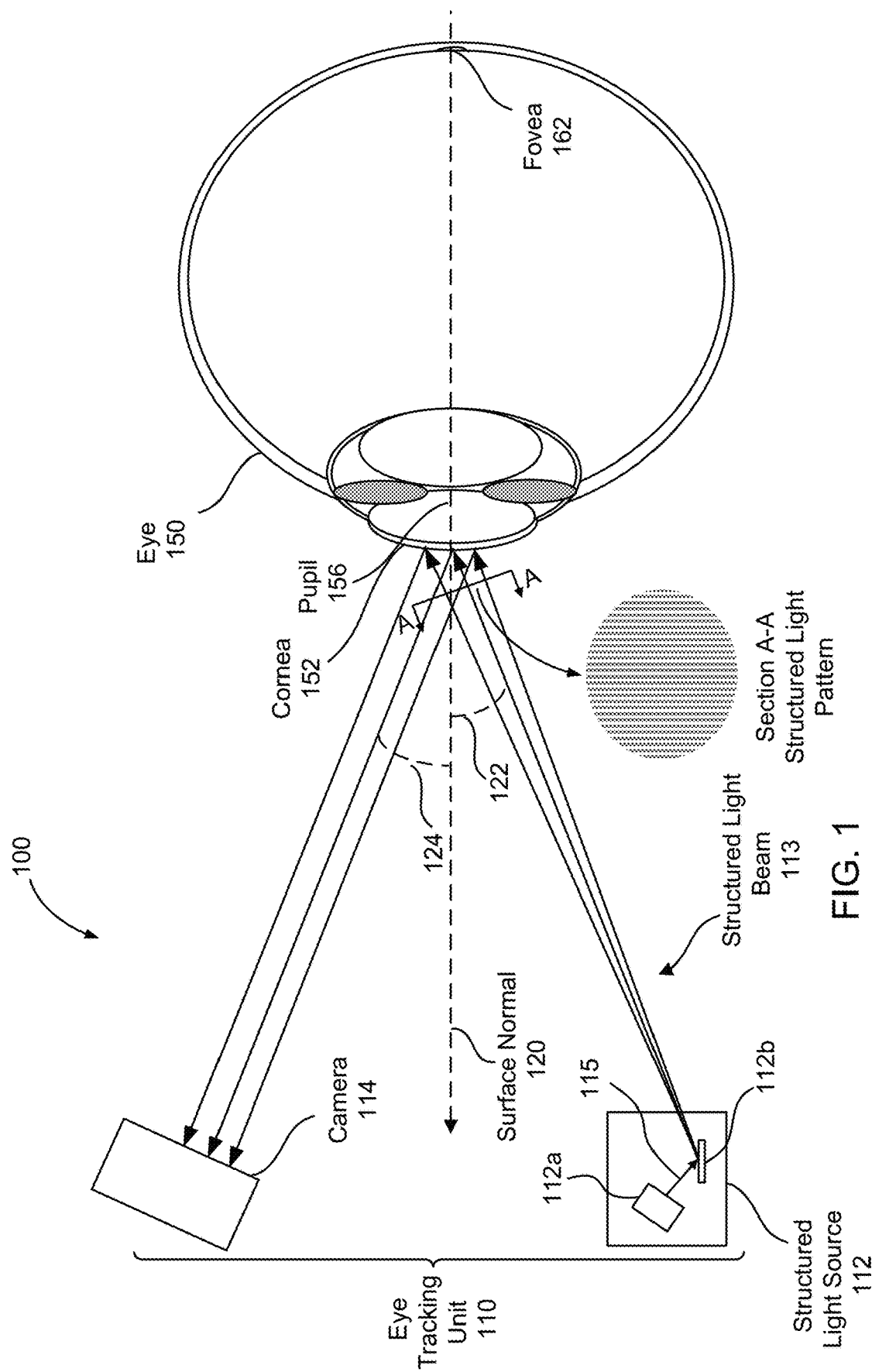
FIG. 1 illustrates an example of an eye-tracking system according to certain embodiments.

As used herein, visible light may refer to light with a wavelength between about 380 nm to about 750 nm. Near infrared (NIR) light may refer to light with a wavelength between about 750 nm to about 2500 nm. One or more embodiments can operate within an infrared (IR) wavelength range that can be detected by a suitable IR sensor (e.g., a complementary metal-oxide semiconductor (CMOS), a charge-coupled device (CCD) sensor, or an InGaAs sensor for short-wave infrared (SWIR) light), such as between 830 nm and 860 nm, between 930 nm and 980 nm, and/or between 900 nm to 2500 nm (for SWIR).

As also used herein, a substrate may refer to a medium onto which a waveguide layer can be deposited. The substrate may include one or more types of dielectric materials, such as glass, quartz, lithium niobate, plastic, polymer, poly(methyl methacrylate) (PMMA), crystal, semiconductors (such as AlGaAs, GaAs, InP, and the like), ceramic, and the like. At least one type of material of the substrate may be transparent to visible light and NIR light. As used herein, a material may be "transparent" to a light beam if the light beam can pass through the material with a high transmission rate, such as larger than 60%, 75%, 80%, 90%, 95%, 98%, 99%, or higher, where a small portion of any incident light beam (e.g., less than 40%, 25%, 20%, 10%, 5%, 2%, 1%, or less) may be scattered, reflected, or absorbed by the material. The substrate may also provide a relatively large waveguide-substrate index difference ($\Delta n = n_{waveguide} - n_{substrate}$). In addition, it is also desirable for the waveguide-substrate system to guide both TE and TM polarizations with a large index difference $\Delta n$.

An artificial reality system may include a near-eye display (e.g., a headset or a pair of glasses) configured to present content to a user via a display and, in some cases, may also include a console configured to generate content for presentation to the user. To improve user interaction with presented content, the console may modify or generate content based on a user's gaze direction and/or eye position (referred to as "gaze direction" herein). To track the gaze direction, the near-eye display may illuminate a surface of the user's eye using light sources mounted to or within the near-eye display. An imaging device (e.g., a camera) included in the near-eye display may then capture light reflected by one or more surfaces of the user's eye.

According to some embodiments, a high-speed integrated optics eye-tracking system may employ a chip-scale surface acoustic wave (SAW) device to actively illuminate the surface of the eye with structured light. In some embodiments, such chip-scale SAWs can have planar waveguide architectures with both the waveguide layer and the substrate layer being made from a transparent material. An acoustic transducer that is bonded to a waveguide layer can generate an acousto-optical response in the material of the waveguide layer, which may result in a dynamic diffraction grating being generated within the waveguide layer. A light beam input into the SAW device can then be diffracted by the dynamic diffraction grating to generate two or more output beams that can be coupled out of the SAW device. These two or more output diffracted beams can then interfere to produce a structured light pattern in the form of a sinusoidal interference pattern (referred to herein as an interferometric structured light pattern). Accordingly, rather than projecting a constellation of a small number of dots/ glints that sparsely sample the surface of the eye, the SAW device can project the interferometric structured light pattern onto the surface of the eye and thereby densely samples the eye's surface. For example, the structured light pattern that results from the interference of two or more diffracted beams generated by the SAW device is a sinusoidal pattern of alternating bright-dark bars (referred to as interference fringes). The periodicity of the interferometric pattern can be adaptively controlled in real time by changing the driving RF frequencies (which changes the frequency of the acoustic wave, therefore resulting in a different diffraction grating within the waveguide layer).

In some embodiments, the use of the interferometric structured light pattern generated by the SAW device can result in a densely sampled and more accurate depth profile of the eye. For example, a depth profile of the eye surface can be created at video frame rates by using, e.g., triangulation with depth sensing. More specifically, the technique of fringe interferometry can be employed to provide for an integrated eye-tracking system that is both power efficient and cost effective.

As a chip-scale integrated device, the SAW device can be made to be largely transparent to visible light and thus, the SAW device can be placed in the field of view of the user without obstructing the field of view. This allows the SAW device to project the structured light pattern at a more direct, rather than oblique, angle onto the surface of the eye, thereby providing a light source that is preferable to one that projects multiple glints at a steep illumination angle.

For example, in an AR application, the user can look through the substrate of the SAW device and see the outside world. In a VR application, the user can look through the substrate of the SAW device to view the displayed content. At the same time, light (e.g., NIR light) from the SAW device can directly illuminate the eye without the need for a complex optical system to direct the light from the periphery of the head mounted display or AR glasses.

FIG. 1 illustrates an example of an eye-tracking system 100 according to some embodiments. Eye-tracking system 100 may include an eye-tracking unit 110, which may include a structured light generator 112 and a camera 114. Structured light generator 112 may include a light emitter 112a (e.g., a laser or LED) that is optically coupled to a SAW device 112b. As described in further detail below with respect to FIG. 2A, the light emitter 112a can generate an input optical beam 115 that is then coupled into the SAW device 112b. The SAW device 112b converts the input optical beam into structured light and outputs a structured light beam 113 at angle of incidence 122 relative to a surface normal vector 120 of an eye 150. Surface normal vector 120 is orthogonal to a portion of the surface (e.g., cornea 152) of eye 150 illuminated by structured light generator 112. In the example shown in FIG. 1, surface normal vector 120 may be the same as the foveal axis (a line from the center of pupil 156 to fovea 162) of eye 150. Camera 114 may be mounted at a camera angle 124 relative to surface normal vector 120 of eye 150. In some embodiments, the angle of incidence 122 and camera angle 124 are configured such that camera 114 may capture images via specular reflections of light incident on cornea 152 of eye 150.

The light emitted by structured light generator 112 may substantially uniformly illuminate a portion of the eye surface (e.g., cornea 152) with an interferometric structured light pattern such as that shown in the cross section A-A of the structured light beam 113. Camera 114 may collect the light that is reflected by the illuminated portion of eye 150 and project it onto an image sensor of camera 114 (not shown). Camera 114 may also correct one or more optical errors or aberrations to improve the contrast and other properties of the images captured by the image sensor of camera 114. In some embodiments, camera 114 may also magnify the reflected light. The image sensor of camera 114 may capture incident light focused by a lens assembly of camera 114 (not shown). Thus, camera 114 may effectively capture an image of the structured light pattern that is projected onto the corneal surface. In some embodiments, the structured light pattern can be an interference pattern, e.g. a periodic pattern of alternating bright and dark regions that is generated by a SAW device as shown in cross section A-A of the structured light beam 113. In such a case, to determine a position/orientation of the eye 150, the eye-tracking unit 110 can perform fringe interferometry to determine a depth image of the corneal surface using interference fringes, as described in further detail below. In some embodiments, the fringe interferometry can be performed by an image processing system that is operatively connected to the camera 114 and the image processing system can include one or more processor(s) and a non-transitory computer-readable medium. In some embodiments, the image processing system can include a digital signal processor (DSP) or some other combinations of custom hardware and software, such as an ASIC, system on a chip (SOC), field programmable gate array (FPGA), and the like.

Each pixel of the image sensor may include a light-sensitive circuit that can output a current or voltage signal proportional to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 114 may include a complementary metal-oxide semiconductor (CMOS) pixel array, which may be used with laser light having a wavelength less than about 850 nm. As another example, the image sensor of camera 114 may include an indium gallium arsenide (InGaAs) pixel array, or other materials or combinations of materials that absorb light in the short-wave infrared (SWIR) band. Such an image sensor may be used with a laser emitting laser light having a wavelength between about 900 nm and about 1160 nm, or between about 900 nm and about 2100 nm. In some embodiments, each pixel may be a multi-tap pixel that includes more than one on-pixel charge storage bins. The multi-tap pixel can be dynamically controlled by electric fields to steer electrons generated in response to the incident light into respective storage bins. As such, multiple phase shifted interference fringes can be captured in a time-interleaved manner using the same set of pixels, thus reducing motion blur between the images and reducing or eliminating down-time between captures because all charge storage bins can be read out at the end of the time-interleaved capture.

Figure 2A:
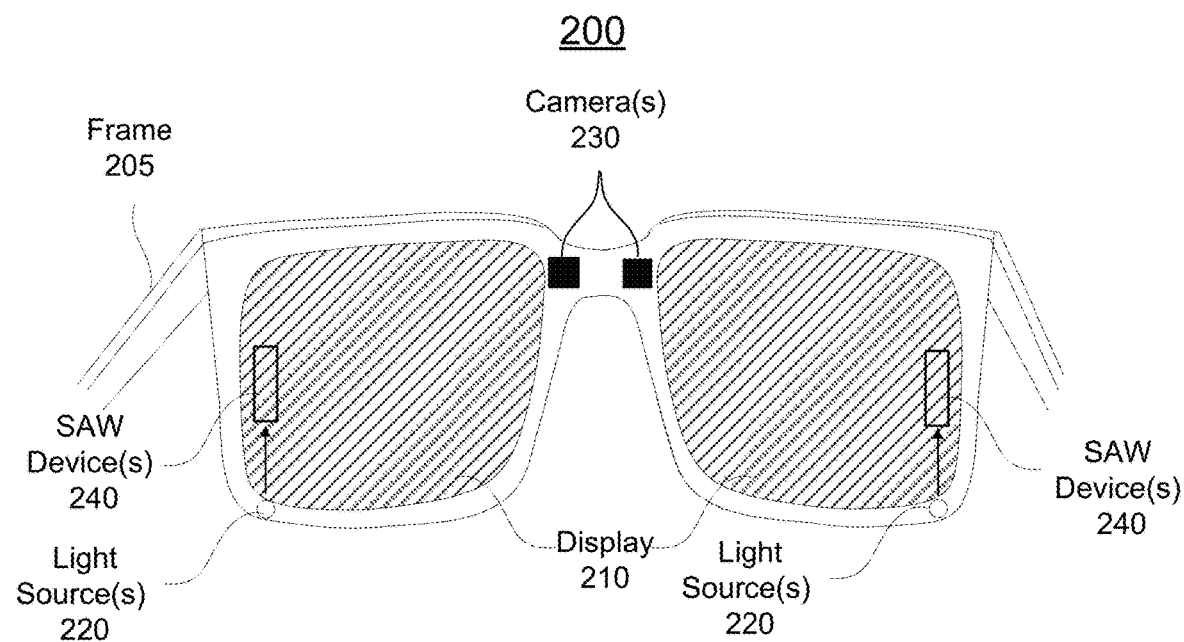
FIGS. 2A-2B illustrate a simplified near-eye display system including an illustrative eye-tracking unit according to certain embodiments.

FIG. 2A is a perspective view of a simplified near-eye display system 200 including an illustrative eye-tracking unit according to some embodiments. More specifically, FIG. 2A is a perspective view of a near-eye display as viewed from a side that faces the eyes of the user. Near-eye display system 200 may be configured to operate as a VR display (and thus may include an opaque display), an AR display (and thus may include a transparent display), and/or a MR display (which can be either opaque or transparent depending on the application). Near-eye display system 200 may include a frame 205 and a display 210. Frame 205 may be coupled to, or embedded with, one or more electrical or optical components. Display 210 may include display electronics and/or display optics (not shown), and may be configured to present content to a user. For example, as described above, display 210 may include an LCD display panel, an LED display panel, and/or an optical display panel (e.g., a waveguide display assembly). In some embodiments, the display 210 may be a transparent display so that the user can see objects in the field of view ahead of the user.

Near-eye display system 200 may include one or more light sources 220, one or more SAW device(s) 240, and one or more camera(s) 230. Light source(s) 220 and camera(s) 230 may be coupled to or embedded in frame 205, as shown, or attached to or embedded in the surface of the display 210. SAW device(s) 240 can be embedded in or attached to the surface of the display(s) 210 as shown, or embedded in or attached to the frame 205. Light source(s) 220 may emit light in certain frequency range (e.g., NIR) towards an input coupler of the SAW device(s) 240 and the SAW devices 240 may then emit a structured light pattern (not shown) toward the eye of the user. The structured light pattern may then be reflected by the eye of the user and the reflected light may then be received by camera(s) 230 to form one or more images of the structured light pattern that has reflected from the surface of the eye. Based on the images captured by camera(s) 230, a 3D image, or depth image, of the surface of the user's eye can be computed. For example, a depth image can be computed using fringe interferometry or the like, as described in further detail below. Finally, an eye's position and gaze direction may be determined using the 3D images. The image content displayed on display 210 may then be adjusted accordingly based on the gaze direction and/or gaze point of the user.

Figure 2B:
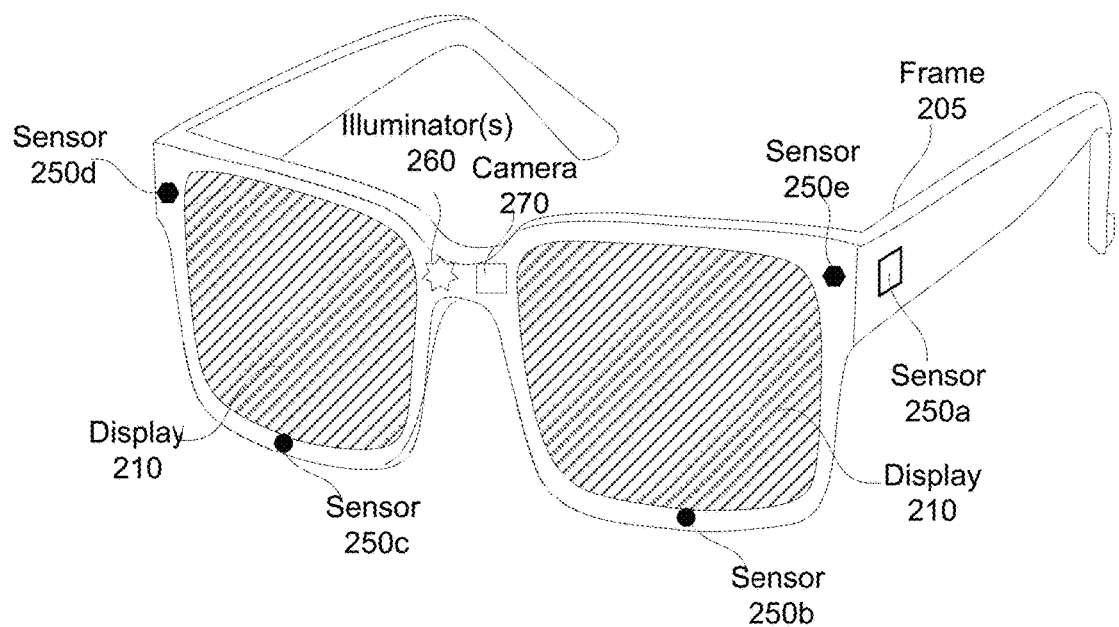

FIG. 2B is a front perspective view of the simplified near-eye display system 200 according to some embodiments. Near-eye display system 200 may further include various sensors 250a, 250b, 250c, 250d, and 250e on or within frame 205. In some embodiments, sensors 250a-250e may include one or more depth sensors, motion sensors, position sensors, inertial sensors, or ambient light sensors. In some embodiments, sensors 250a-250e may include one or more image sensors configured to generate image data representing different fields of views in different directions. In some embodiments, sensors 250a-250e may be used as input devices to control or influence the displayed content of near-eye display system 200, and/or to provide an interactive VR/AR/MR experience to a user of near-eye display system 200. In some embodiments, sensors 250a-250e may also be used for stereoscopic imaging.

In some embodiments, near-eye display system 200 may further include one or more illuminators 260 to project light into the physical environment. The projected light may be associated with different frequency bands (e.g., visible light, infra-red light, ultra-violet light, etc.) and may serve various purposes. For example, illuminator(s) 260 may project light in a dark environment (or in an environment with low intensity of infra-red light, ultra-violet light, etc.) to assist sensors 250a-250e in capturing images of different objects within the dark environment. In some embodiments, illuminator(s) 260 may be used to project certain light pattern onto the objects within the environment. For example, in some embodiments, illuminator(s) 260 can themselves be SAW devices and can be used to determine a depth map of the environment in a manner that is analogous to that described below in reference to FIGS. 10-12.

In some embodiments, near-eye display system 200 may also include a high-resolution camera 270. Camera 270 may capture images of the physical environment in the field of view. The captured images may be processed, for example, by a virtual reality engine (e.g., virtual reality engine 1316 of FIG. 13) to add virtual objects to the captured images or modify physical objects in the captured images, and the processed images may be displayed to the user by display 210 for AR or MR applications.

Figure 3:
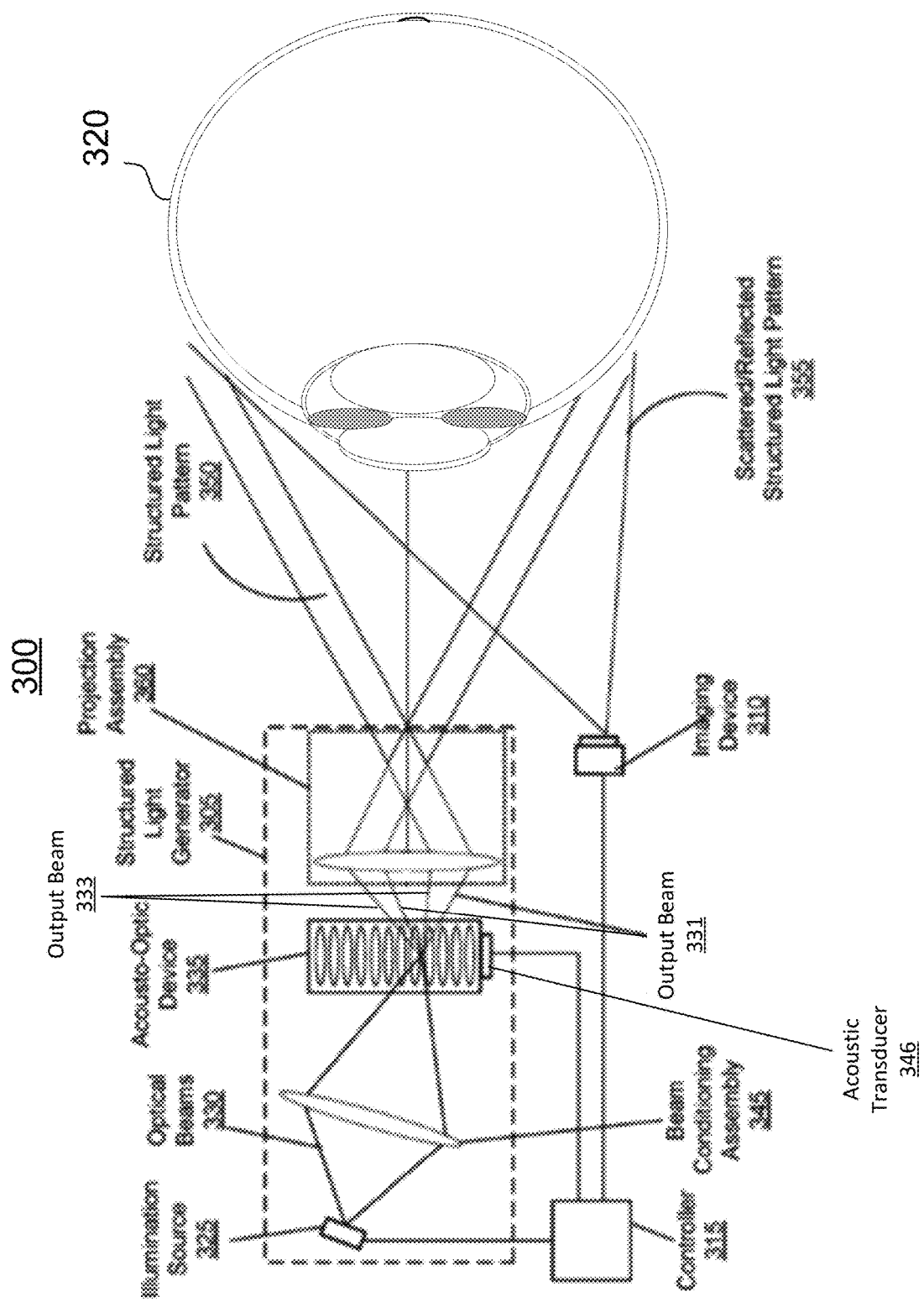
FIG. 3 is an illustrative eye-tracking system including an illustrative example of an acousto-optic device according to certain embodiments.

FIG. 3 is simplified block diagram of an illustrative eye-tracking system 300 including an illustrative example of an acousto-optic device according to certain embodiments. Eye-tracking system 300 may be a specific implementation of eye-tracking unit 110 of FIG. 1 that includes an acousto-optic device, e.g., either a SAW device or a bulk acousto-optic device. The elements of FIG. 3 are arranged to facilitate explanation of the functional aspects of each block and as such, the views and arrangement of the individual elements are not intended to limit how these elements would be oriented in physical space in an actual device. Some elements shown in FIG. 3 may be optional. The eye-tracking system 300 includes a structured light generator 305, an imaging device 310, and a controller 315. The controller 315 can be coupled to both the structured light generator 305 and the imaging device 310. Structured light generator 305 can be implemented using, for example, a chip-scale SAW device or a bulk acousto-optic device. The eye-tracking system 300 can be configured to be a component of a near eye display system, e.g., near-eye display system 200 shown in FIG. 2.

In some embodiments, the structured light generator 305 includes an illumination source 325 (e.g., a laser diode, or the like) configured to emit one or more optical beams 330 into an optional beam conditioning assembly 345 that is configured to couple optical beams 330 into an acousto-optic device 335. Acousto-optic device 335 may be a SAW device or a bulk acousto-optic device. In some embodiments, the structured light generator 305 can also include an optional projection assembly 360 that is configured to project one or more structured light patterns generated by the acousto-optic device 335 towards an outer surface of user's eye 320. As described in more detail below, the geometric properties of the spatial light pattern (e.g., the phase and spatial frequency) can be controlled via one or more emission control signals that are generated by the controller 315.

The beam conditioning assembly 345 directs the one or more optical beams 330 toward a portion of an acousto-optic device 335. The beam conditioning assembly 345 can include one or more optical elements (e.g., lenses, prisms, gratings, and the like) and can shape the beam so that the beam can be coupled into a waveguide region of the acousto-optic device 335. In some embodiments, the beam conditioning assembly can include optics that couple optical beams into an interaction region of the acousto-optic device. As described in more detail below, for the case of SAW, the interaction region is a region in the waveguide material of the SAW device where the light beam can interact with a dynamic diffraction grating. The dynamic diffraction grating is caused by an acousto-optical effect that is induced in the waveguide material by a surface propagating acoustic wave generated by, for example, an interdigital electrode transducer mounted to the SAW device, as described in more detail below in reference to FIGS. 4, 6, and 7. The planar interdigital electrode transducer may have a relatively high electro-acoustic conversion efficiency, hence it is ideal for efficiently generating dynamic acoustic gratings to diffract input light. For the bulk AO device case, acousto-optic device 335 can generate diverging diffracted output beam 331 and diverging diffracted output beam 333 that are both directed toward the surface of eye 320 by projection assembly 360. In the regions where diverging diffracted output beam 331 spatially overlaps with diverging diffracted output beam 333, a structured light pattern 350 may be formed due to the optical interference between the two beams.

In some embodiments, the acousto-optic device 335 can form a reflective dynamic diffraction grating, as described in further detail below in reference to FIGS. 6A-6B. In some embodiments, the acousto-optic device 335 can form a transmissive dynamic diffraction grating, as described in further detail below in reference to FIGS. 4A-4B. In a transmissive dynamic diffraction, the diffracted beam can be transmitted through the substrate layer of the SAW device before being projected onto the eye, while in a reflective diffraction grating, the diffracted beams can be reflected from the substrate layer of the acousto-optic device before being projected onto the eye.

In some embodiments, the projection assembly 360 is positioned to receive the structured light pattern 340 and to project it onto the eye 320. The projection assembly 360 can include one or more optical elements (lenses mirrors, scanning mirrors, etc.). In some embodiments, the projection assembly 360 may further dynamically direct (e.g., by adjusting an orientation of a scanning mirror) the one or more structured light patterns 350 to different locations within the eye 320 in accordance with the emission control signal.

The structured light pattern 350 illuminates the eye 320, resulting in one or more scattered or reflected structured light patterns 355 being generated based on the reflection/scattering of the structured light pattern 350 from, e.g., the corneal surface of the eye 320. The imaging device 310 then captures one or more images of the scattered/reflected structured light patterns 355.

The imaging device 310 is configured to capture images in a band of light that includes the light emitted from the illumination source 325. In one embodiment, the imaging device 310 is an infrared (IR) camera configured to capture images in the IR spectrum. In another embodiment, the imaging device 310 is configured to capture image light within a visible spectrum. The imaging device 310 can be configured to operate with a frame rate in the range of kHz to MHz for fast detection of movements of the eye 320.

The acousto-optic device 335 includes an acoustic transducer 346 that generates acoustic waves responsible for inducing the diffraction grating structure in the acousto-optic device 335. The transducer 346 can be operatively coupled to controller 315 and can receive an RF drive signal generated by the controller 315 in response to the emission control signal. In some embodiments, the data for generating an emission control signal for determining a depth profile of the eye of the user can be precomputed and stored in one or more non-transitory computer readable media (e.g. RAM, ROM, hard drives, and the like) that are accessible by one or more processors of the controller 315. In some embodiments, the emission control signal includes instructions for constructing an RF drive signal that is sent to the transducer of the acousto-optic device 335. In response to the RF drive signal, the acousto-optic device 335 generates an acoustic wave in an interaction region of the acousto-optic device 335 to form the dynamic diffraction grating. The instructions for constructing the RF drive signal may include RF information, such as one or more RF frequencies or ranges of RF frequencies, RF amplitudes, an RF modulation signal, or some combination thereof. The RF modulation signal can describe how the RF frequency and amplitude output by a transducer is to change with time. RF modulation may include, e.g., switching on/off or modulating the amplitude of the RF signal, sweeping across a range of RF frequencies at some rate, skipping between discrete frequencies at some rate, dynamically moving to specific frequencies, or some other changes to the RF frequency or amplitude as a function of time, or some combinations thereof.

In some embodiments, the controller 315 is configured to control operations of some or all of the components of the eye-tracking system 300 in FIG. 3. In some embodiments, the controller 315 provides an illumination source control signal to the illumination source 325 based on the emission control signal to control intensity of the one or more optical beams 330, modulation of the one or more optical beams 330, a time duration during which the illumination source 325 is activated, etc. For example, the controller 315 can drive the illumination source 325 using a modulated electrical current signal, voltage signal, and the like.

In some embodiments, a radio frequency at which the acousto-optic device 335 is driven controls a separation and pointing direction of the output beams 333, 331 that are diffracted by the acousto-optic device 335. Hence, a spatial frequency of the resulting structured light pattern 340 (and a spatial frequency of the structured light pattern 350) depends on the radio frequency at which the acousto-optic device 335 is driven. In addition, to adjust a diffraction angle at which the one or more optical beams 330 are diffracted, the controller 315 can modify the frequency of the RF drive signal thereby modifying the frequency at which the acousto-optic device 335 is driven. In this way, the controller 315 can instruct the acousto-optic device 335 to scan a plurality of diffraction angles at which the one or more optical beams 330 are diffracted and interfered to form the structured light pattern 340.

The controller 315 may generate the emission control signal based on, e.g., a predetermined list of values for radio frequencies and/or phases stored in a look-up table found on a computer readable medium of the controller 315, and these radio frequencies can correspond to different periods and/or phases of the dynamic diffraction grating thereby resulting in different structured light patterns being emitted, e.g. as shown in FIG. 8. In some embodiments, the controller 315 can dynamic compute (e.g., in real-time) RF information for the RF drive signal that drives the acousto-optic device 335 to generate the structured light pattern 350 suitable for computing a depth image of the surface of eye 320.

The controller 315 is further coupled to the imaging device 310 and determines depth information for surface of the eye 320 using images captured of the eye 320 including portions of the structured light pattern. For example, the controller 315 may utilize a model that describes the distance as a function of pattern deformation and/or phase shift and may utilize structured light patterns having differing phases and frequencies such that the process of fringe interferometry can be used to compute the depth image. In some embodiments, the controller 315 is configured to provide appropriate instructions to one or more components of the structured light generator 305 to generate at least three phase shifted structured light patterns 350 that illuminate the eye 320. The phase shifted structured light patterns 350 may be generated by sending time delayed radio frequency signals from the controller 315 to the acousto-optic device 335. Each relative time delay may be pre-calculated at the controller 315 to yield a desired phase shift. Hence several phase-shifted structured light patterns 350 may be projected to the object(s) in the eye 320. The imaging device 310 may capture the phase-shifted structured light patterns 355 that are distorted, e.g., via a parallax effect, by the shape of the object(s) in the eye 320. Then, the controller 315 may use a triangulation calculation to obtain a depth map/image, as described in further detail below in reference to FIGS. 9-11.

In FIGS. 2-3, the positions of the various elements shown in any of the figures are meant to be illustrative only and other configurations are possible without departing from the scope of the present disclosure. For example, camera(s) 230 may be mounted on the outer edge of the frame 205 and the SAW device(s) 240 can be mounted to the nose ridge of the frame 205. Likewise, light source(s) 220 can be mounted anywhere on the frame, e.g., at the top of the frame so that light is directed downward rather than upward, as is currently depicted. In FIG. 3, illumination source 325 may be on the frame. Beam conditioning assembly 345 and projection assembly 360 may be optional. Acousto-optic device 335 may be a chip-scale SAW device or a bulk acousto-optic device.

Figure 5:
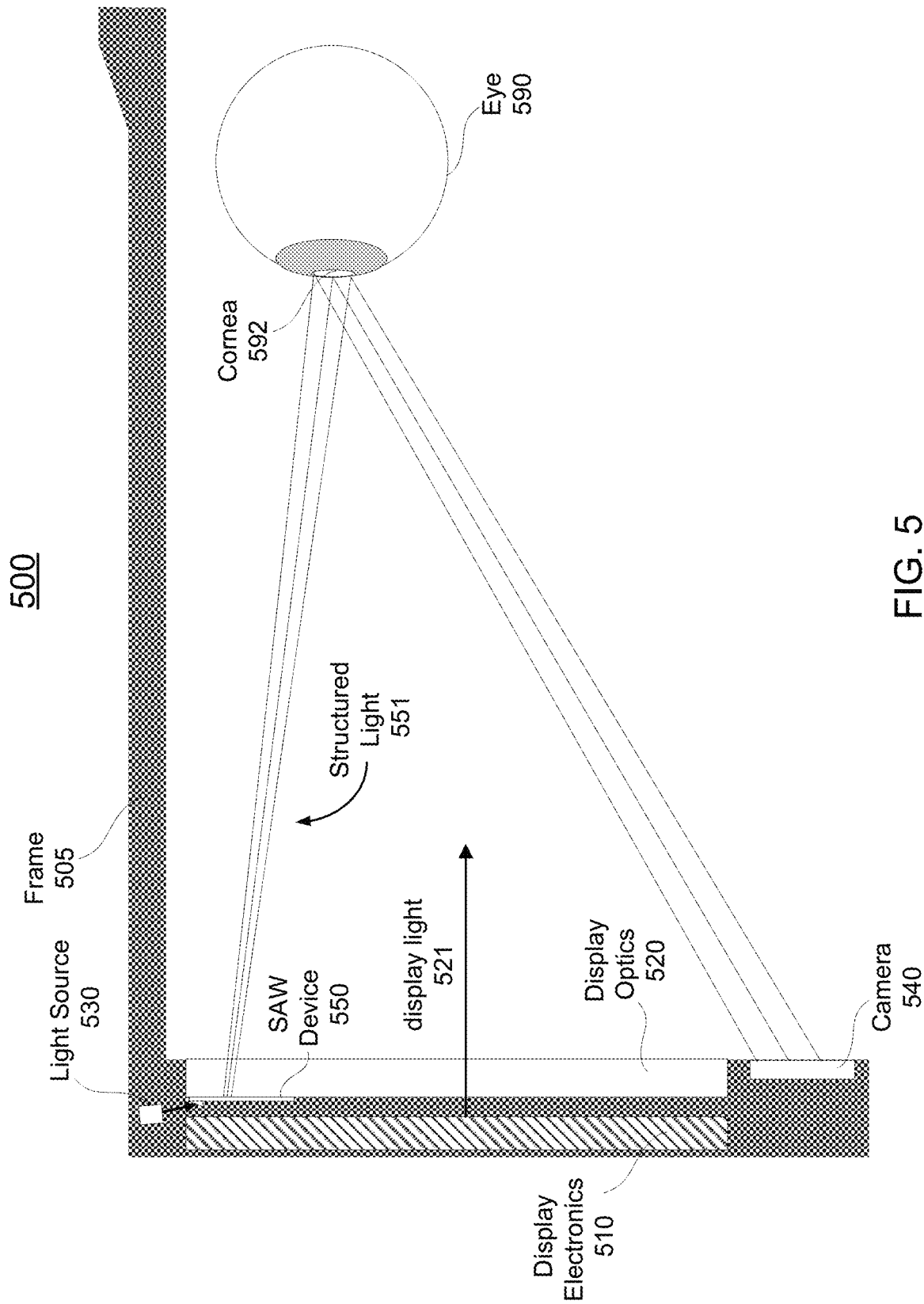
FIG. 5 shows a cross-sectional view of an illustrative near-eye display system including an example of an eye-tracking unit according to certain embodiments.

FIGS. 4A-4B illustrate a chip-scale SAW device 400 according to certain embodiments, with FIG. 4A showing a top view and FIG. 4B showing a cross-sectional view of the SAW device having a layered planar waveguide device architecture. In some embodiments, the SAW device can be fitted to a pair of AR glasses shown in FIGS. 2A-2B, or as shown in FIG. 5 described below. Because of its small size, transparency, and light weight, the SAW device 400 is particularly suitable for near eye displays, e.g., for use in AR, VR, and/or MR applications. In some embodiments, the SAW device 400 can be a few mm long and approximately on the order of less than 0.1 mm wide, and can be formed of transparent material, making it nearly imperceptible to a user, even if the device is mounted within the user's field of view, e.g., directly onto a surface of the display element of the near-eye display system. In some embodiments, the SAW device can be embedded in the display element.

The SAW device 400 includes a beam conditioning assembly, in this example in the form of an input light coupling device 401 that is bonded to a surface of a planar waveguide device 403. While not shown here, the input light coupling device 401 can also include a focusing element to focus a free space input light beam 402 into the acousto-optic interaction area 411 of SAW device 400. Input light coupling device 401 can be a prism, as shown, or can be some other types of integrated optical elements, e.g., a microlens, a grating coupler, or the like. In some embodiments, planar waveguide device 403 includes at least two layers: a waveguide layer 405 and a transparent substrate layer 407 in the form of a step-index layer, as illustrated in the cross-sectional view shown in FIG. 4B. In some embodiments, the thickness $t_1$ of the waveguide layer 405 can be on the order of a micron, e.g., within an end-point inclusive range of 1-2 microns. The thickness $t_2$ of the transparent substrate layer 407 can be on the order of 1 mm. In some embodiments, the length L of the acousto-optic interaction area can be on the order of 10 mm, e.g., within an endpoint inclusive range of 3 to 15 mm. In some embodiments, the waveguide layer can be embedded inside the substrate layer in the form of graded-index layer. In this case, a lithium niobate waveguide can be used as the graded-index layer by in and out diffusion techniques. For the step index case illustrated in FIG. 4, the step-index layer can be formed by deposition or sputtering techniques. During operation, input light coupling device 401 receives the free space input light beam 402 (shown as a dashed line) and couples free space input light beam 402 into one or more guided modes of the waveguide layer 405. As a result, a guided light beam 406 propagates within the waveguide layer 405 along a guided wave propagation direction that is substantially parallel to the longitudinal direction (z-direction) of the of the planar waveguide device 403.

An interdigital electrode transducer 409 can be bonded to the top or the bottom of a piezoelectric thin film that is deposited on the optical waveguide layer 405. If the substrate material is sufficiently piezoelectric such as lithium niobate crystals, the interdigital electrode transducer can be directly deposited onto the optical waveguide layer. In some embodiments, the width W of the acoustic transducer can be in the range of 100-200 microns and the thickness T can be on the order of a few hundreds of microns. When driven by an RF signal, the interdigital electrode transducer 409 can send a surface acoustic wave 408 that propagates along the surface of the waveguide layer 405. For optimal diffraction efficiency, the wave vectors of the diffracted light, the incident light and the surface acoustic wave would satisfy the momentum conservation principle given by:

$$k_d = k_i + k_a, \quad (1)$$

where $k_d$, $k_i$, and $k_a$ are the wave vectors of the diffracted light, incident light, and the surface acoustic wave, respectively. There can be either isotropic or anisotropic acousto-optic Bragg diffraction, depending on the type of the optical waveguide. For isotopic AO interactions, the diffracted light has the same state of polarization as the incident light. For anisotropic AO interactions, the diffracted light has an orthogonal state of polarization than that of the incident light due to the mode conversion in the anisotropic waveguide (TE to TM, or TM to TE mode). The surface acoustic wave 408 has a width W and interacts with the material of the waveguide layer 405 to create time dependent non-linear acousto-optical effect resulting in a dynamic diffraction grating structure being formed within the acousto-optic interaction area 411. The guided light beam 406 can be diffracted by the dynamic diffraction grating, thereby generating two or more diffracted output beams 415, referred to as the +1 and −1 diffracted orders, as shown in FIG. 4B.

In the SAW device 400 of FIGS. 4A-4B, an architecture is employed that results in a collinear geometry, i.e., guided light beam 406 propagates in a direction that is substantially co-linear, but opposite to (counter-propagating or anti-parallel to) the direction of propagation of the acoustic wave 408. In some embodiments, the waveguide layer 405 can be formed from lithium niobate (LN) crystal, tellurium dioxide, glass, and the like. In the collinear geometry shown in FIG. 4, the SAW device operates as an anisotropic optical waveguide. As guided light beam 406 interacts with the surface acoustic waves in the acousto-optic interaction area, it is diffracted downward, through the substrate layer 407, forming the two diffracted output beams 415 that are coupled out of the device back into free space below the substrate layer 407. For example, in the anisotropic optical waveguide configuration, if the transverse electric (TE) mode is coupled into the waveguide layer 405 of the SAW device, the diffracted light (e.g., the +1,−1 orders) will be in the transverse magnetic (TM) mode and will not be allowed to propagate in the top waveguide layer 405 due to the mode conversion process. However, in this example the substrate layer 407 possesses an orthogonal eigenmode and thus can support the propagation of the diffracted TM modes. Therefore, any light in the diffracted TM mode is then coupled out of the device as shown in FIG. 4B. In view of the above behavior, the anisotropic optical waveguide having a collinear geometry provides a system that can be employed as a transmission-type source for generating structured light illumination. Accordingly, in a "transmission-type" geometry, the SAW device accepts the free space input light beam 402 on one side of the device and emits a structured light beam (formed from the interference of the diffracted +1, −1 orders) on the other side of the device.

FIG. 5 shows a cross-sectional view of an illustrative near-eye display system 500 including an example of an eye-tracking unit. The eye-tracking unit includes a light source 530, a transmission-type SAW device 550, and a camera 540. Near-eye display system 500 may also include a frame 505 and a display system that includes display electronics 510 and/or display optics 520 coupled to, or embedded in, frame 505. Display electronics 510 may display images to the user according to data received from a console, such as console 1310, as described below in reference to FIG. 13.

Light source 530 and camera 540 may be coupled to, or embedded in, frame 505, as shown, or may be coupled to, or embedded, in the display optics 520 and/or the display electronics 510. In various embodiments, light source 530 and camera 540 may be positioned above, below, to the left, or to the right of the user's line of sight to display optics 520 and display electronics 510, as is shown here and, e.g., as was shown above in FIG. 2B. Transmission-type SAW device 550 can be formed from transparent material as described above in reference to FIGS. 4A-4B and thus, can be mounted anywhere on the display optics 520 or display electronics 510, including within the field of view of the user. The structured light 551 that is coupled out through the substrate of the transmission-type SAW device 550 light may be reflected, e.g., specularly reflected, by the cornea 592 of eye 590 of the user and detected by camera 540. The camera 540 can capture multiple images of the structured light after it has reflected from the eye 590 of the user. Based on the images captured by camera 540, the position of eye 590, including the orientation, location, and gaze direction may be determined. The image content displayed on the display system may then be adjusted accordingly based on the gaze direction and/or gaze point of the user.

In some embodiments, light source 530 may include a coherent light source, such as a laser. For example, the laser may emit light in the infrared spectrum having a wavelength between about 830 nm and about 860 nm. As another example, the laser may emit light having a wavelength between about 900 nm and about 1160 nm, such as between about 930 nm and about 980 nm. In another embodiment, the light source may have a wavelength between 900 nm to 2500 nm for SWIR illumination. Alternatively, the laser may emit light having a wavelength in the visible spectrum. Illuminating the eye with light in the infrared spectrum may be beneficial to reduce interference and noise from visible light emitted by display electronics 510 or from external visible light that passes into near-eye display 500, as in some AR applications. Additionally, the light source 530 may have a low power to prevent user discomfort or injury. For example, the laser may be a Class 1 laser. As another example, the laser may be an edge emitting semiconductor laser, a super-luminescent diode (SLED), or a vertical-cavity surface-emitting laser (VCSEL).

Although light source 530 may typically include a spatially coherent light source, non-coherent, or partially coherent light sources may be used in some embodiments. For example, light source 530 may include an LED light source having an output spectrum in the visible band or in the infrared band. However, due to their decreased spatial coherence and relatively broad output spectra (low temporal coherence), LEDs may produce structured light patterns with lower contrast than those produced using coherent light sources. However, the artifact of speckles may be reduced as a trade-off for low temporal coherent light sources.

In some embodiments, camera 540 may capture light reflected by the portion of the eye surface illuminated by the transmission-type SAW device 550. In one example, camera 540 may capture an image with a pixel array of 30 by 30 pixels, where a pixel may correspond to a resolution of about 15 to 40 micrometers of the eye surface. In this example, the imaged portion of the surface of eye 590 may have an area of between about 0.20 and about 1.44 square millimeters. In various embodiments, camera 540 may have increased resolution to increase eye-tracking precision and accuracy. For example, camera 540 may have a quarter video graphic array (QVGA) resolution with a pixel array of 320×240 pixels. Increasing the number of pixels included in camera 540 may allow the size of the surface of eye 590 corresponding to a pixel to be decreased and/or may allow the area of the surface of eye 590 imaged by camera 540 to be increased. Because each pixel provides an independent depth measurement, the more number of pixel leads to increased depth resolution. In some embodiments, using as few pixels as practicable may beneficially reduce the power consumption of camera 540. Likewise, illuminating and imaging a smaller area of the surface of the eye may also beneficially reduce power consumption by the laser. In some embodiments, camera 540 can capture images at video frame rates, e.g., 60 Hz or 120 Hz. In some embodiments, camera 540 may include a sensor that can capture images at a very high frame rate, e.g., such as those used in optical mouse sensors. For example, in some cases, camera 540 may capture about 5,000 images per second to provide eye-tracking data having increased precision.

The display optics 520 of near-eye display system 500 may include optical waveguides and optical couplers, may magnify display light 521 emitted by display electronics 510, may correct optical errors associated with the display light 521, and may present display light 521 to the user of near-eye display system 500. In various embodiments, display optics 520 may include one or more optical elements such as optical substrates, optical waveguides, optical couplers, gratings, an aperture, a Fresnel lens, a convex lens, a concave lens, a filter, or any other suitable optical element that may affect display light 521 that is emitted from display electronics 510. Display optics 520 may include a combination of different optical elements as well as mechanical couplings to maintain relative spacing and orientation of the optical elements in the combination. One or more optical elements in display optics 520 may have an optical coating, such as an anti-reflective coating, a reflective coating, a filtering coating, or a combination of different optical coatings.

Figure 6A:
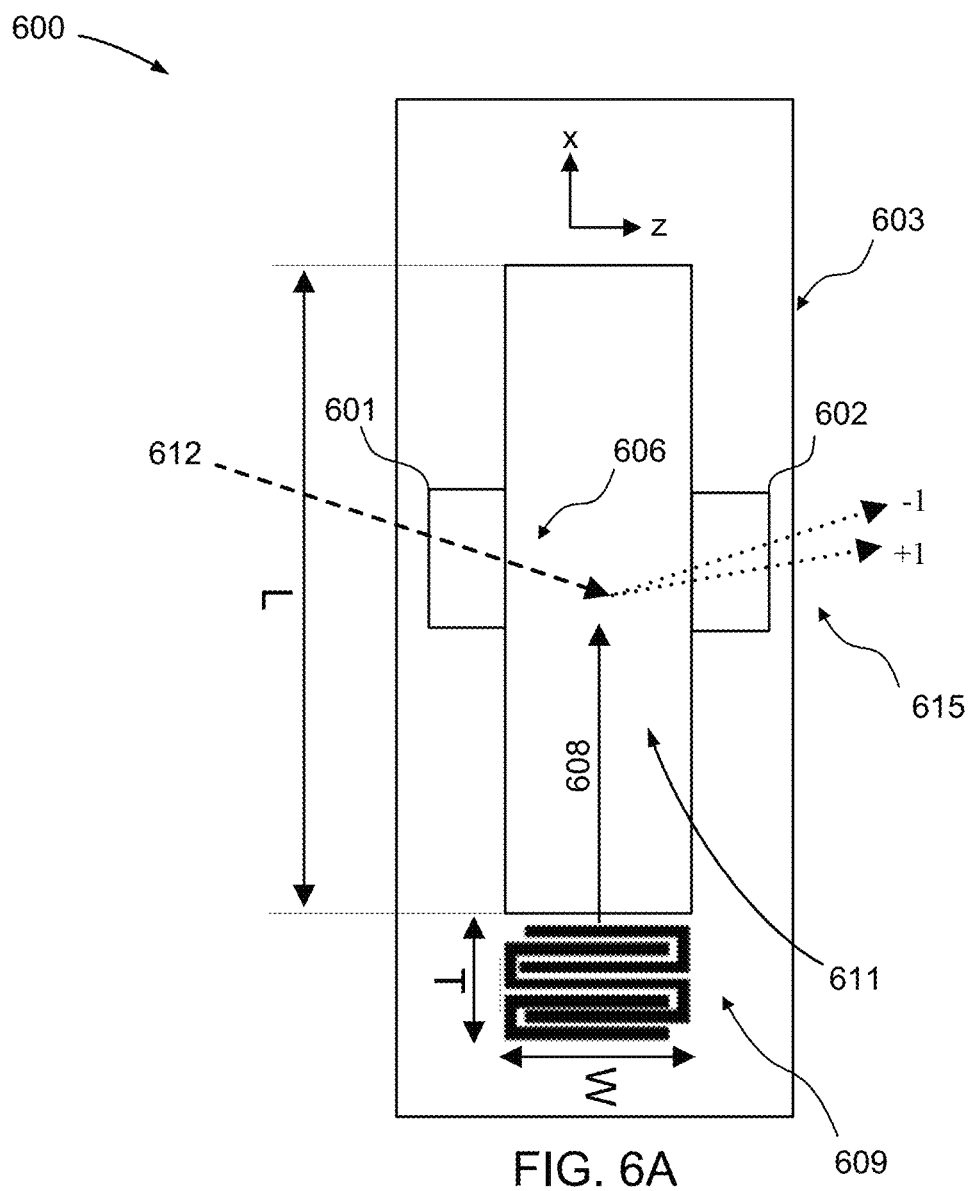
FIGS. 6A-6B illustrate an example of a reflection-type surface acoustic wave device for eye-tracking according to certain embodiments.
Figure 6B:
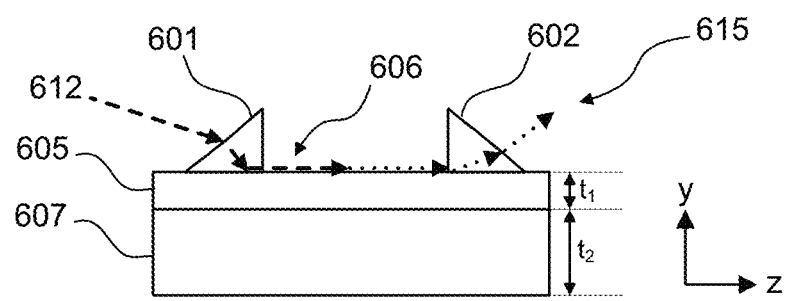
Figure 7:
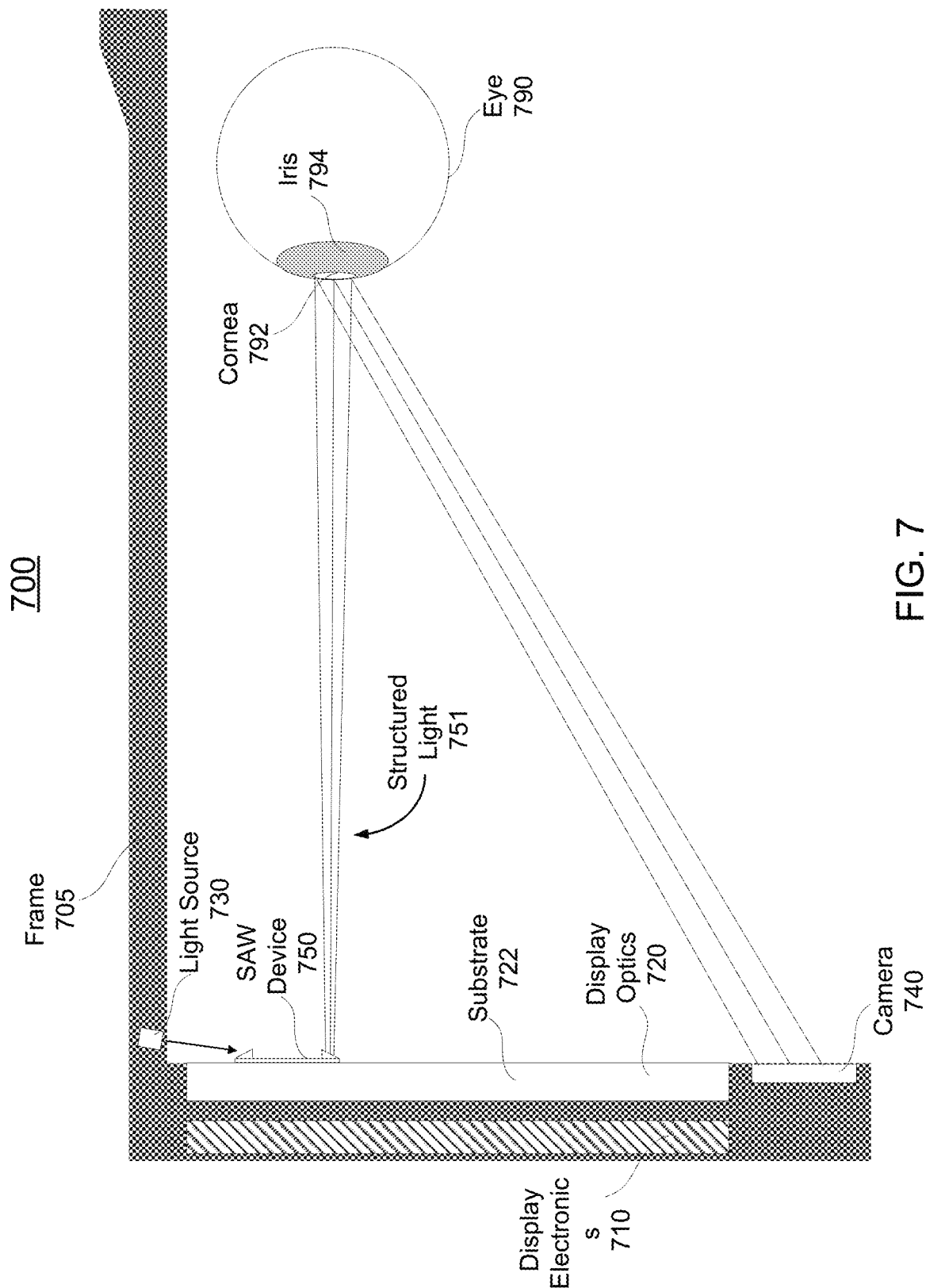
FIG. 7 shows a reflection-type source for structured light illumination employed in a near-eye display system for eye-tracking according to certain embodiments.

FIGS. 6A-6B illustrate an example of a co-planar type SAW device 600 for eye-tracking according to certain embodiments, with FIG. 6A showing a top view and FIG. 6B showing a cross-sectional view of a SAW having a layered planar waveguide device architecture. In this co-planar guided-wave SAW geometry, the underlying mechanism of the acousto-optic interaction may be analogous to that of the bulk acousto-optic wave interaction in a bulk acousto-optic device. In some embodiments, the device can be fitted to a pair of AR glasses as shown in FIGS. 2A-2B above, or as shown in FIGS. 5 and 7. Because of its small size, transparency, and light weight, the SAW device 600 is particularly suitable for near eye displays, e.g., for use in AR, VR, and/or MR applications. In some embodiments, the SAW device 600 can be a few mm long and have a width on the order of a hundred to a few hundred of micrometers. The SAW device 600 can be formed of transparent material, making it nearly imperceptible to a user, even if the device is mounted within the user's field of view, e.g., directly onto a surface of the display element of the near-eye display system.

The SAW device 600 includes a beam conditioning assembly taking the form of an input light coupling device 601. While not shown here, the input light coupling device 601 can also include a focusing element to focus a free space input light beam 612 into the acousto-optic interaction area 611 of SAW device 600. Input light coupling device 601 can be a prism, as shown, or can be some other type of integrated optical element, e.g., a microlens, grating coupler or the like. Planar waveguide device 603 includes at least two layers a waveguide layer 605 and a transparent substrate layer 607, as best illustrated in the cross-sectional view shown in FIG. 6B. During operation, input light coupling device 601 receives the free space input light beam 612 (shown as a dashed line) and couples free space input light beam 612 into one or more guided modes of the waveguide layer 605. As a result, a guided light beam 606 propagates within the waveguide layer 605, advancing through the device in the x-z plane of the waveguide layer 605.

An acoustic transducer 609 can be bonded to a surface of the waveguide layer 605 if the layer is sufficiently piezoelectric (for e.g., lithium niobate), or be bonded to the top or bottom of a thin film piezoelectric layer if the waveguide material is non-piezoelectric (for e.g., GaAs). When driven by an RF signal, the acoustic transducer 609 can send a surface acoustic wave 608 along the surface of the waveguide layer 605, e.g., along the x-direction, which is a direction that is in the plane of the waveguide layer but not necessarily co-linear with the guided light beam 606. Rather, the x-direction is closer to being perpendicular to the guided light beam 606 in this embodiment. The surface acoustic wave 608 has a width W and interacts with the material of the waveguide layer 605 to create time dependent non-linear optical effect resulting in a dynamic diffraction grating structure being formed within the acousto-optic interaction area 611. The guided light beam 606 can be diffracted by the dynamic diffraction grating, generating two or more diffracted output beams 615, referred to as the +1 and −1 diffracted orders, as shown in FIG. 6A.

Unlike the transmission-type SAW device 400 shown and described above in reference to FIGS. 4A-4B, the SAW device 600 operates in a reflection-type or co-planar configuration. In this case, the waveguide may be isotropic material, hence the state of the polarization is preserved for the diffracted light, hence there is no mode conversion involved. For example, instead of diffracting into the substrate layer through the optical mode conversion process as in the anisotropic waveguide illustrated in FIG. 4, the diffracted beams with a preserve state of polarization can be guided within the top waveguide layer 605 and may travel along the width of the SAW device. The diffracted beams are then out-coupled into free space via the output coupling device 602 that can be bonded to a surface of a planar waveguide device 603. The substrate layer in this case can be designed to diffuse any residual light, e.g., the substrate layer can be a YZ-cut crystal. In this configuration if a transverse magnetic (TM) mode is sent to the SAW device 600, a TM mode will be diffracted and both modes will be polarized along the Y-axis. Likewise, if a transverse electric (TE) mode is sent to the SAW device, both the incident and diffracted modes will be TE and polarized along Z-axis.

As mentioned above, lithium niobate can be used as the material for optical waveguide. However, lithium niobate's shear mode figure of merit (FoM) is relatively low $$\left(M_2 = 7.0 \times 10^{-15} \frac{m^2}{W}\right).$$

Alternatively, tellurium dioxide (TeO$_2$) can be used as the waveguide layer. TeO$_2$ has a much higher shear mode FoM $$\left(M_2 = 793 \times 10^{-15} \frac{m^2}{W}\right)$$

and thus can form a much more effective dynamic diffraction grating with a higher diffraction efficiency (DE), where DE is defined to be the percentage of the input beam power that is diffracted into either the +1 or −1 diffracted orders. The overlap integral l indicating the overlap between the spatial distributions of the optical incident wave and the acoustic wave can be written as:

$$I = \frac{\int v(x)|U(x)|^2 dx}{\int |U(x)|^2 dx}, \quad (2)$$

where v(x) represents the transverse distribution of the induced periodic index of refraction variation, U(x) is the transverse distribution of the incident and diffracted optical waveguide modes. l is assumed to be 1 for the calculation. The DE increases as the width W of the interdigital transducer increases. The aspect ratio between W (transducer width/surface acoustic beam width) and H (surface acoustic wave height) needs to be selected to maximize the DE of the first order diffracted beam, given the acoustic power and Bragg angle parameters. In one particular example, the ideal W/H ratio would be 5.3 for 100% DE. For efficient SAW devices that requires low input acoustic power, it is necessary to have a large W/H aspect ratio, a large FoM, and a large overlap integral l. In addition to a high FoM, TeO$_2$ also possesses a high temperature stability which is beneficial for AR glass applications. However, because TeO$_2$ can be a lossy material, the thickness should be maintained small on the order of sub-hundred micrometers.

FIG. 7 shows a reflection-type source for structured light illumination employed in a near-eye display system 700 for eye-tracking according to certain embodiments. The near-eye display system 700 is similar to the near eye display system 500 already described in detail above in reference to FIG. 5 so the structural detail will not be reproduced here for the sake of conciseness. The illustrative near-eye display system 700 includes an example eye-tracking unit including a light source 730, a reflection-type SAW device 750, and a camera 740. Near-eye display system 700 may also include a frame 705 and a display system that includes display electronics 710 and/or display optics 720 coupled to or embedded in frame 705. Display electronics 710 may display images to the user according to data received from a console, such as console 1310, as described below in reference to FIG. 13.

Reflection-type SAW device 750 can be formed from transparent material as described above in reference to FIGS. 6A-6B, and thus can be mounted anywhere on the display optics or display electronics, including within the field of view of the user. The structured light 751 that is out-coupled form the reflection-type SAW device 750 may then be reflected, e.g., specularly reflected, by the cornea 792 of eye 790 of the user and detected by camera 740. Note that because of the reflection-type architecture of the reflection-type SAW device 750, the light source 730 is positioned such that the light incident on the reflection-type SAW device 750 is incident on the same side of the device that outputs the structured light 751. This is contrasted with the transmission-type SAW device 400 shown in FIGS. 4A and 4B where the light source 530 was positioned to provide incident light on the opposite side of the SAW device from the side that outputs the structured light.

In some embodiments, both the transmission-type and reflection-type SAWS are formed form transparent materials (for the both the waveguide and substrate layers) and thus are particularly suited for AR/MR/VR applications because their small form factor and transparent architecture makes them nearly imperceptible to a user, even if the SAW device is mounted within the user's field of view. For the case of AR/MR applications, the SAW devices can be embedded directly into a transparent display.

FIGS. 8A-8F shows illustrative interferometric structured light patterns that can be generated by a SAW device according to some embodiments. The interferometric structured light patterns can be generated from a SAW device like those described above. In some embodiments, RF information (in the form of an RF signal sent by an RF source, e.g., within the controller 315) determines the period of the dynamic diffraction grating in the SAW device. The RF information can be adjusted to affect the physical parameters of the structured light patterns. For example, by adjusting the frequency or phase of the RF information, the spatial frequency or phase of the interference pattern that is projected onto eyes can be adjusted.

In the interferometric structured light patterns shown in FIG. 8, each panel shows a different structured light pattern that can be output from a SAW device and projected onto a test model of an eye. Each panel is associated with an RF frequency of the drive signal that is sent to the transducer of the SAW device and is also associated with a phase difference between the RF drive signal and the strobing signal of a laser light source that provides light to the SAW device. Because the fringes generated by an acousto-optic modulator (AOM) (e.g., an SAW device) may move (with different phase shift) in free space (e.g., at the acousto-optic modulation speed) within an acousto-optic modulation period, to achieve stationary phase-shifted fringes in space for the camera to record the phase-shifted fringes, the laser light source can be strobed using the same modulation signal (e.g., an AM modulation signal) that drives the AOM or a signal synchronized with the modulation signal and with a certain phase shift. When the laser strobing frequency is the same as the acousto-optic modulation frequency, the fringes may be stationary in space, and thus a lower speed camera (typically on the order of 100 frames per second) can record the images. The phase shift of the fringes may correspond to the phase shift between the strobe signal of the laser light source and the acousto-optic modulation signal.

Figure 8C:
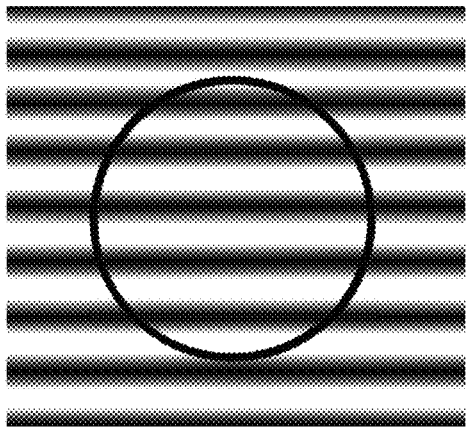
FIGS. 8A-8F show illustrative interferometric structured light patterns generated by a SAW device according to certain embodiments.
Figure 8B:
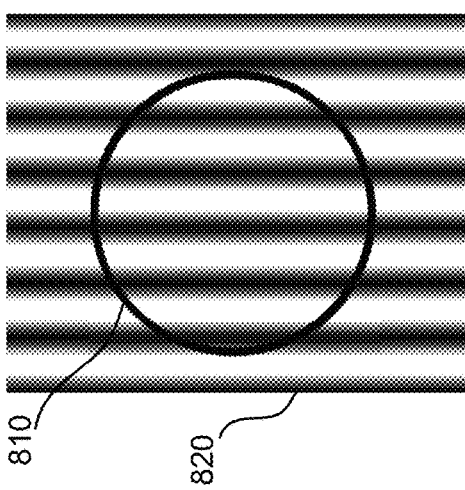
Figure 8A:
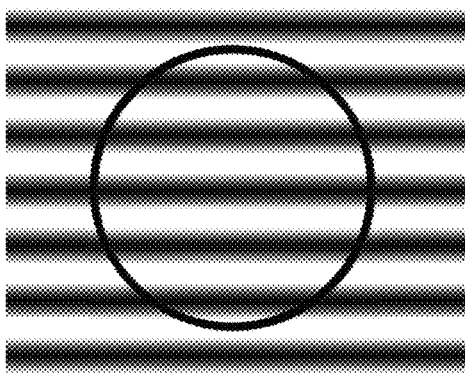
Figure 8F:
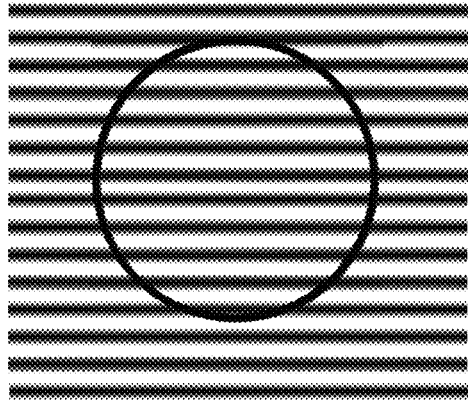
Figure 8E:
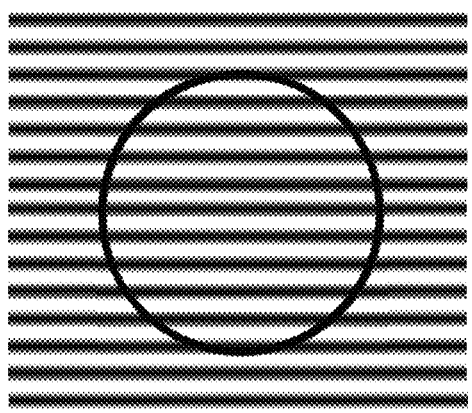
Figure 8D:
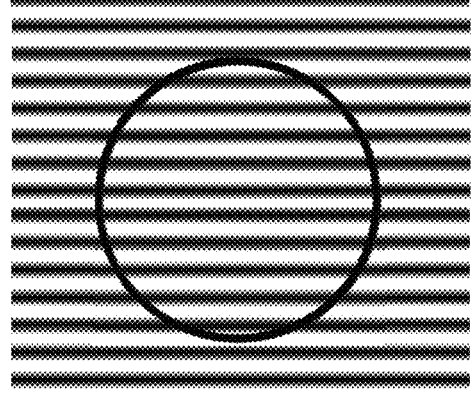

FIGS. 8A-8C show interferometric structured light patterns generated using an RF drive signal with a frequency F1 and different phase shifts with respect to the strobe signal of the laser light source. For example, the phase shift between the RF drive signal and the strobe signal may be 0° for FIG. 8A, 120° for FIG. 8B, and 240° for FIG. 8C. FIGS. 8D-8F show interferometric structured light patterns generated using an RF drive signal with a frequency F2 and different phase shifts with respect to the strobe signal of the laser light source. For example, the phase shift between the RF drive signal and the strobe signal may be 0° for FIG. 8D, 120° for FIG. 8E, and 240° for FIG. 8F.

As can be seen from FIGS. 8A-8F, the spatial frequency of the intensity pattern depends on the RF modulation frequency, with lower spatial frequencies (longer wavelengths) corresponding to lower RF modulation frequencies. Likewise, higher spatial frequencies (shorter wavelengths) correspond to higher RF modulation frequencies. Accordingly, FIGS. 8A-8F show that the spatial frequency of the intensity pattern can be controlled by controlling the frequency of the RF modulation signal provided to the SAW device. For example, FIG. 8A and FIG. 8D show that the density (as measured in number of lines per unit distance) of bright dark bands increases as the RF modulation frequency increases from F1 in FIG. 8A, to F2 (>F1) in the in FIG. 8D.

Likewise, as can be seen from FIGS. 8A-8F, the lateral position of the interference patterns, i.e., the specific location of the dark and bright bands (also referred to herein as the "phase" of the structured light pattern) depends on the phase difference between the RF drive signal and the laser strobing signal. Thus, varying the phase difference between the RF drive signal and the laser strobing signal can result in a lateral advance or retreat of the structured light pattern on the surface of the eye. FIG. 8A-8C or 8D-8F show how the position of the structured light pattern can be laterally scanned across the eye as the phase difference between the RF drive signal and the laser strobing signal changes form 0 degrees to 120 degrees, and then to 240 degrees.

Figure 9:
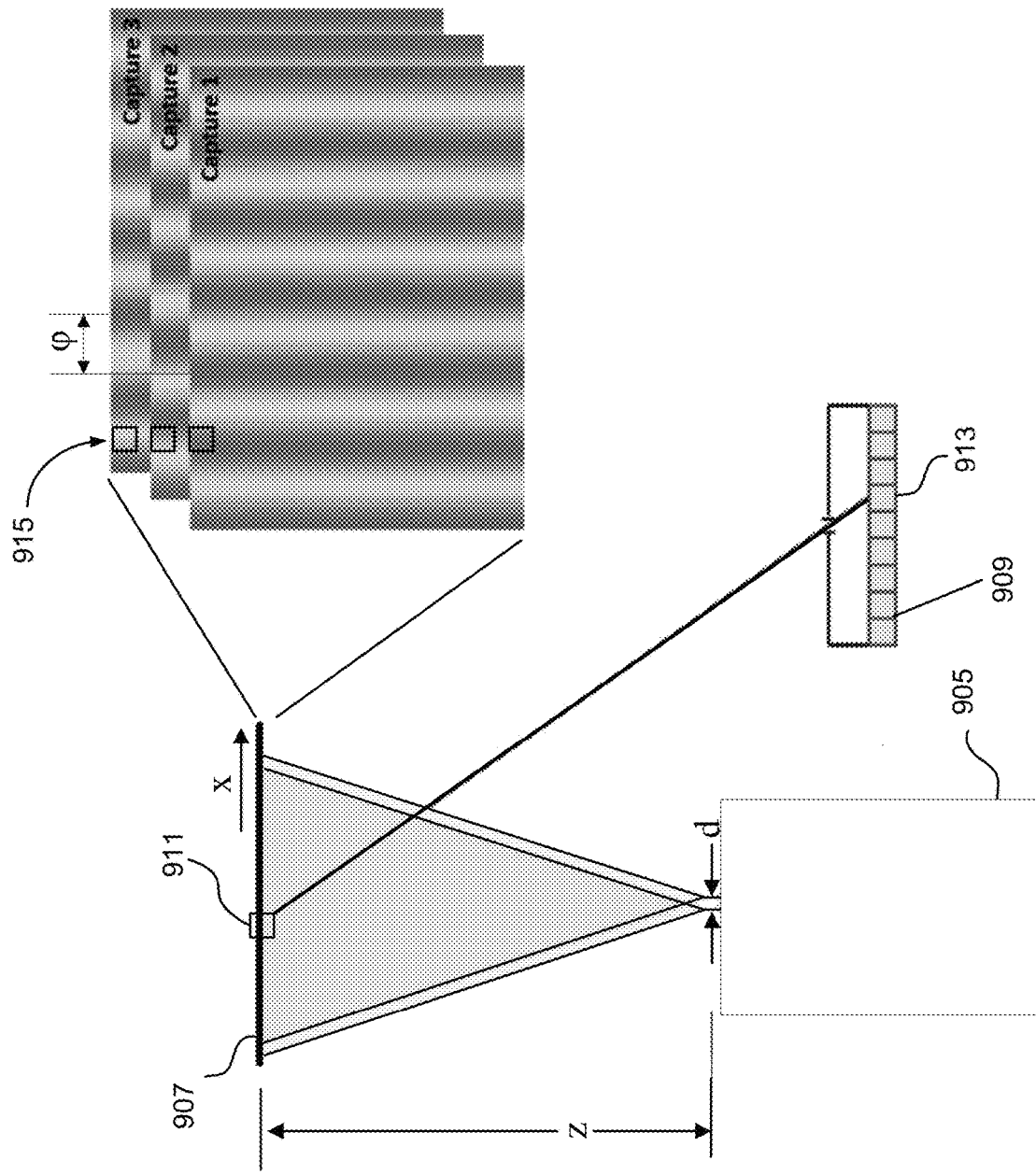
FIG. 9 shows a simplified arrangement of a SAW device for determining a depth map of a user's eye according to certain embodiments.

FIG. 9 shows a simplified arrangement of a SAW device for determining a depth map of a user's eye based on a technique referred to herein as fringe interferometry. In this example, a structured light generator 905 generates a structured light pattern that is projected onto a surface 907 that is located a distance z away. As described above, the structured light pattern from the SAW device is formed from the interference between the two diffracted output beams (referred to as the +1 diffracted order and −1 diffracted order) and thus will be described by a sinusoidally varying intensity pattern. An image of this pattern is then obtained by the imaging device 909 and processed to determine the depth map. Intensity patterns 915 show examples of sinusoidally varying intensity patterns that are projected onto the (assumed flat) surface 907 as viewed from the imaging device 909. In this arrangement, the intensity measured by pixel 913 of the imaging device 909 corresponds to the intensity on the surface 907 at a position 911.

As already discussed in reference to FIG. 8 above, for a SAW device, the structured light pattern results from the interference of the two first order diffracted beams, and thus (assuming infinite plane wave beams) the intensity at the surface 907 as a function of the angular position θ can be approximated by a two-beam interference pattern given by:

$$I(\theta) \propto \cos^2\left[\pi \frac{d}{\lambda}(\theta - \theta_0)\right], \quad (3)$$

where λ is the wavelength of the light, d is the distance between the two diffracted orders at the output of the device, and $\theta_0$ is the phase difference between the optical waves representing the two diffracted orders. Thus, by changing $\theta_0$ (which can be accomplished by altering the phase of the RF drive signal to the SAW device) the lateral position (in the x-direction) of the sinusoidal pattern on the surface 907 can be varied, as shown by the laterally advancing intensity patterns 915, labeled capture 1, capture 2, and capture 3. The technique of depth mapping by phase interferometry relies on the fact as the phase shift $\theta_0$ between the diffracted orders is varied, the overall lateral phase disparity φ as measured on the surface 907 will vary depending on the distance z to the surface 907 (this fact is a consequence of phenomena known as parallax). Thus, in the fringe interferometry technique, two or more images of the surface may be captured using different values for $\theta_0$ (e.g., captures 1, 2, and 3 shown in FIG. 9) and from that data, the phase disparity φ can be computed and then used to determine z, assuming the relationship z=f(φ) can be determined for the geometric arrangement employed.

More specifically, the phase disparity $\phi_{ij}$ for a given pixel at location (i, j) on the sensor can be derived by first recognizing that for a given capture, the measured intensities at each pixel (e.g., at pixel 913) represent the Fourier Transform of the illumination pattern. Furthermore, because the intensity pattern is nearly sinusoidal, most of the power will be contained in the fundamental (k=1) harmonic of the Fourier transform and thus higher order harmonics can be ignored. In the discrete case, the real and imaginary parts of the fundamental harmonic are given by $$a_{1,ij} = \sum_{n=1}^{N} S_{n,ij}\cos(\theta_n)\Delta\theta, \quad (4)$$

$$b_{1,ij} = \sum_{n=1}^{N} S_{n,ij}\sin(\theta_n)\Delta\theta, \quad (5)$$

where $S_{n,ij}$ is the intensity measured during the n-th capture at the pixel located at position (i, j) on the sensor array. $\theta_n$ is an element of a set of phase delays, $[\theta_1, \theta_2, \ldots, \theta_N]$, over which the measurement is to be taken. Each $\theta_n$ may correspond to a phase-shifted fringe pattern in the scene. $\Delta\theta$ is the difference between neighboring $\theta_n$ and can be used for discretized integration. $\Delta\theta$ can be the same or may be different between any two neighboring $\theta_n$. In some embodiments, $\theta_n$ may be uniformly distributed within a full $2\pi$ period, such that $$\Delta\theta = \frac{2\pi}{N}.$$

In some embodiments, 3 or more measurements at different $\theta_n$ may be used to measure a sinusoidal or nearly sinusoidal fringe pattern in order to unambiguously determine $a_{1,ij}$ and $b_{1,ij}$. If the intensity pattern is a perfect sinusoid, N=3 phase shifts can be used for the measurements without loss of accuracy. More than 3 measurements at different $\theta_n$ may be used to remove systematic phase measurement errors when the illumination pattern is substantially non-sinusoidal.

Figure 10:
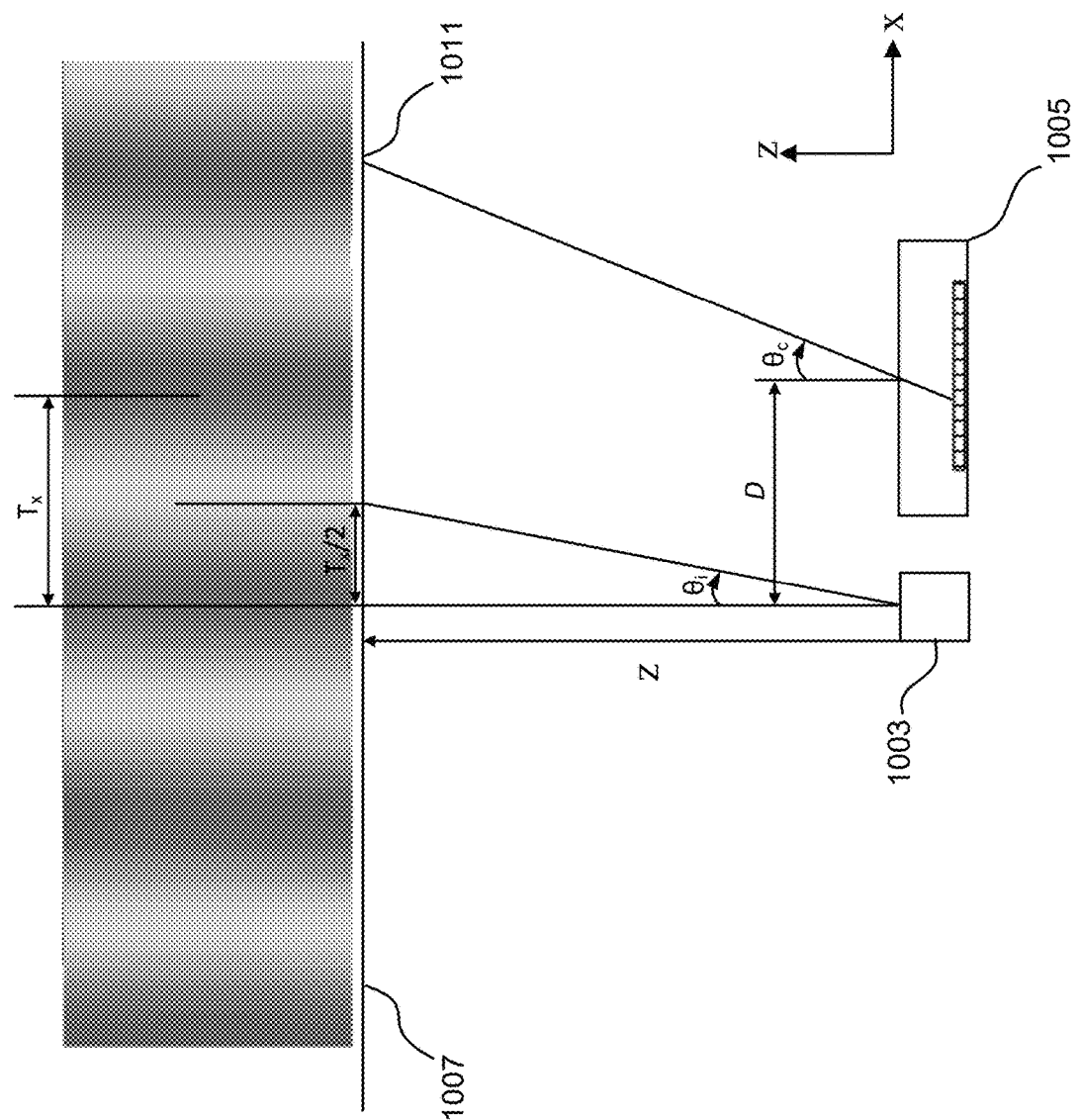
FIG. 10 is a simplified diagram showing various geometric parameters of a system for fringe interferometry according to certain embodiments.

From the computed values of $a_{1,ij}$ and $b_{1,ij}$ the measured phase disparity can be determined by:

$$\phi_{ij} = \tan^{-1}\left(\frac{a_{1,ij}}{b_{1,ij}}\right) - \phi_{1,ij}, \quad (6)$$

where $\phi_{1,ij}$ is a calibration offset. Once the pixel-by-pixel phase disparities are computed, corresponding pixel-by-pixel depth values can be computed by using a triangulation estimate given by:

$$z_{ij} = \frac{D}{\frac{\tan(\theta_i)}{\pi}(\phi_{ij} - \phi_{ij,cal}) - \tan(\theta_c)}, \quad (7)$$

where $\theta_i$, $\theta_c$, and D are known geometric parameters of the system, as shown in FIG. 10, and $\phi_{ij,cal}$ is a calibration constant that can be measured in advance using a calibration setup that images several different objects at known depths $z_{ij}$. In some embodiments, the calibration offset $\phi_{1,ij}$ can be determined using equations (6) and (7) based on known calibration target orientations at known depths $z_{ij}$.

FIG. 10 is a simplified diagram showing various geometric parameters (appeared in equation (5)) of a system for fringe interferometry according to certain embodiments. The separation parameter D is defined to be the distance (in the x-direction) between the output port of the structured light generator 1003 and the entrance pupil of the imaging device 1005. The frequency parameter $\theta_i$ is defined to be the angle subtended by a length in the x direction equal to one half a wavelength (or period) of the sinusoidal intensity pattern that is projected onto a surface 1007 (the intensity pattern is shown in FIG. 10 as if it is viewed from the imaging device, along the z axis), where, as before, the surface 1007 is located a distance z from the structured light generator. Stated mathematically:

$$\frac{T_x}{2} = z\tan(\theta_i), \quad (8)$$

where $T_x$ is the wavelength or period (in the x-direction) of the intensity pattern. $\theta_{c,ij}$ is the center ray angle from a pixel $p_{ij}$ to the target. For example, the $\theta_{c,ij}$ shown in FIG. 10 is the angle from a target point 1011 on the surface 1007 to a pixel $p_{ij}$ on the imaging device. $\theta_{c,ij}$ may be different for different pixels on the imaging device and can be determined, for example, through a camera calibration procedure that may include measuring the camera principle point, the focal length, and the image distortion profile of the camera.

Because the $2\pi$ periodicity of the sinusoidal interference pattern, there may be ambiguities in resolving phase disparity $\phi_{ij}$ that are larger than $2\pi$ when determining the phase disparity $\phi_{ij}$ as described above. For example, a phase disparity of $4\pi$ is indistinguishable from a phase disparity of $2\pi$. To avoid this potential ambiguity, in some embodiments, the continuous intensity pattern of light emitted by the illumination source can have a relatively low spatial frequency such that the largest expected phase disparity induced from the expected depth variance over the length of the object being imaged is lower than $2\pi$. However, use of a relatively low spatial frequency may decrease precision of the depth determination. Alternatively, the structured light generator can project a sequence of sinusoidal patterns having different spatial frequencies to help "unwrap" the phase disparity ambiguity. For example using two spatial frequencies can extend the range of phase disparities over which the phase disparity can be unambiguously determined. Using three frequencies can extend the range even further.

Figures 11A, 11B, 11C:
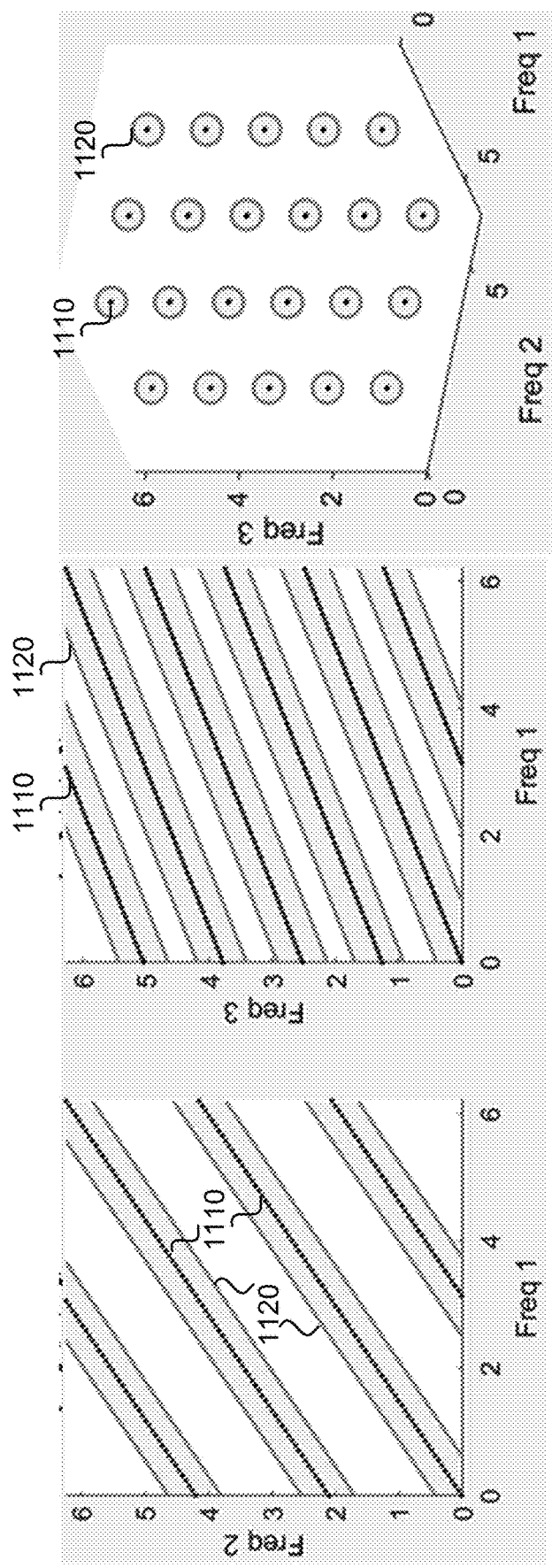
FIGS. 11A-11C show how more than one spatial frequency can be used to "unwrap" a phase measurement for fringe interferometry according to certain embodiments.

FIGS. 11A-11C shows how more than one spatial frequency can be used to "unwrap" a phase disparity measurement. In FIGS. 11A-11C, each axis corresponds to the measured phase disparities (in radians) at a particular frequency, and has a range of from 0 to $2\pi$. The label "Freq X" indicates which fringe pattern with a particular frequency is used to measure the phase disparities represented by each axis. As described above, a fringe pattern with a particular spatial frequency can be generated by the amplitude modulation of a SAW device with a particular RF frequency. If the camera operates on 3 fringe patterns with different frequencies, and, for each pattern, 3 phase shifts (θn) are used, a total of 9 total intensity values may be recorded for each pixel. For each fringe pattern (or frequency), the measurements made for the 3 phase shifts (θ$_n$) may be combined to yield a measured phase disparity φ$_{ij}$ that may be wrapped over the range[0, 2π] according to equations (4)-(6).

FIG. 11C is a 3D plot showing the combinations of wrapped phase disparities measured for a particular set of frequencies (e.g., 3 frequencies). FIGS. 11A and 11B show different 2D cross-sections of the 3D plot shown in FIG. 11C. Dotted lines 1110 indicate expected combinations of phase disparities at different spatial frequencies for all possible depths, where each point on the lines corresponds to a depth value Z. Dotted lines 1110 may be generated from analytical equations and may be used as a look up table to determine the depth value based on the measured phase disparities at different frequencies. The actual measured data points may not always fall on a dotted line 1110 due to some measurement errors caused by, for example, sensor readout noise and shot noise. These measurement errors may cause the measured data points to be away from dotted lines 1110, causing ambiguity as to what dotted line the data points may be associated with and what the real depths are for these data points. Each region 1120 between two solid lines around a dotted line 1110 represents a filter. Data points that fall outside of regions 1120 may be filtered out because the measurement errors for the data point may be too large and it may be difficult to determine which dotted lines the data points are associated with.

To determine a pixel depth, the measured phase disparities at three frequencies (e.g., Freq 1, Freq 2, and Freq 3) for the pixel may be mapped to a 3D data point in the 3D plot shown in FIG. 11C. The 3D data point may be compared against dotted lines 1110 and regions 1120 in the 3D plot. If the 3D data point falls in a particular region 1120 which includes a particular dotted line 1110, the depth associated with a point on the particular dotted line that is closest to the 3D point among all points on the particular dotted line can be used to determine the pixel depth. If the 3D data point is outside of any region 1120, the measurement errors may be too large and no depth value may be determined for the 3D data point. In some embodiment, an invalid depth flag may be sent to indicate that no pixel depth has been determined for the corresponding pixel.

Figure 12:
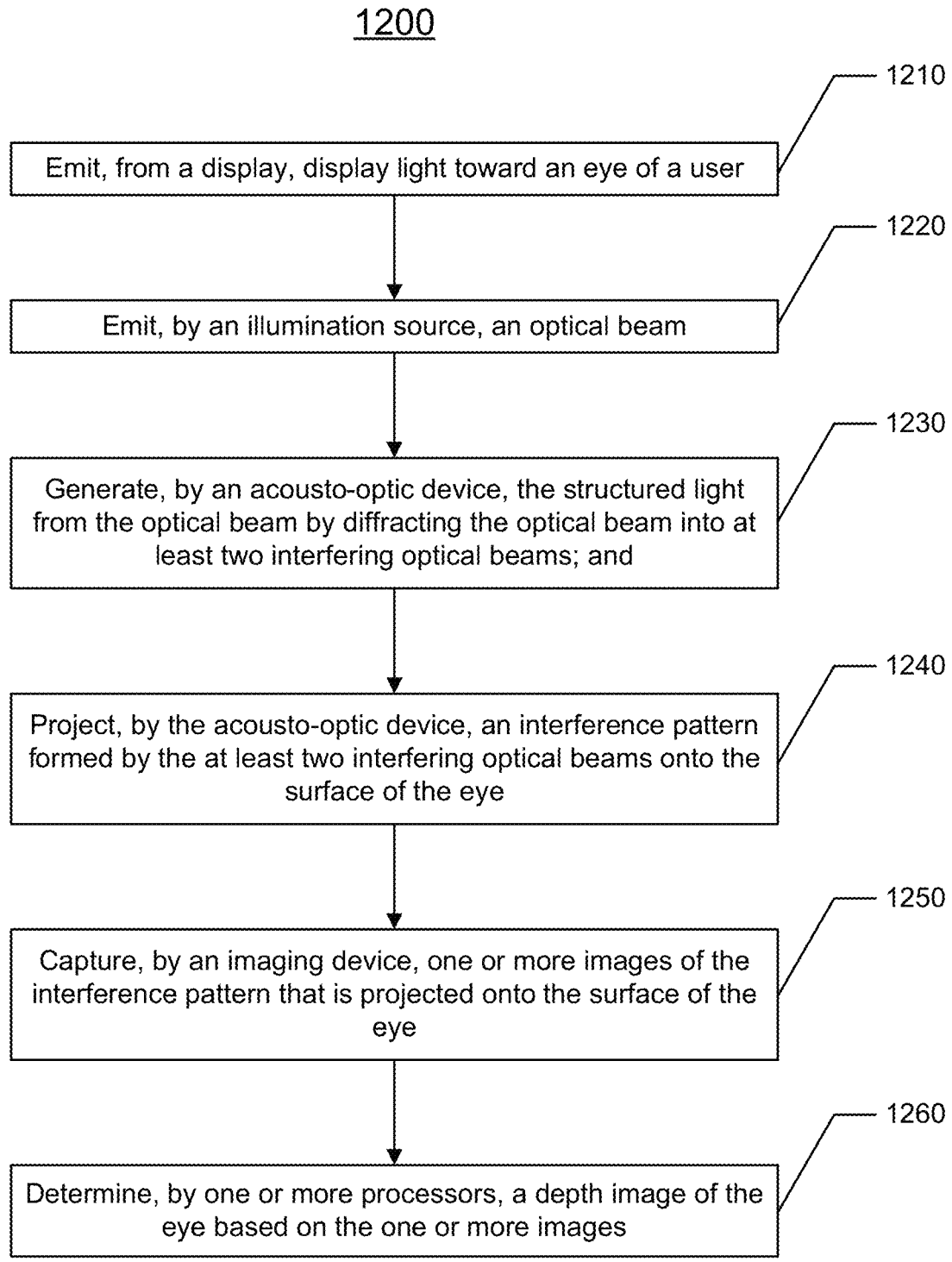
FIG. 12 is a flow chart illustrating an example of a method for eye-tracking in a near-eye display system according to certain embodiments.

FIG. 12 is a flow chart 1200 illustrating an example of a method for eye-tracking in a near-eye display system according to certain embodiments.

In step 1210, a display can emit display light toward an eye of a user. According to certain embodiments, the display can be transparent or opaque and can employ any display technology that is suitable for a VR/AR/MR near-eye display. For example, the display can include one or more display panels such as a liquid crystal display (LCD), an organic light emitting diode (OLED) display, a micro light emitting diode (mLED) display, an active-matrix OLED display (AMOLED), a transparent OLED display (TOLED), or some other display.

In step 1220, an illumination source can emit an optical beam that is suitable for use as a light source in an eye-tracking system. For example, as described above in reference to FIG. 5, the light source can be a laser or an LED. The laser may be an edge emitting semiconductor laser or a vertical-cavity surface-emitting laser (VCSEL). The light source can be a coherent light source, a non-coherent light source, or partially coherent light sources. In some embodiments, the light source can emit an optical beam having a wavelength within the IR spectrum such that the eye-tracking light is imperceptible to a user.

In step 1230, an acousto-optic device generates a structured light pattern from the optical beam by diffracting the optical beam into at least two interfering optical beams, as described above in reference to FIGS. 1-8F. In some embodiments, the acousto-optic device is a surface acoustic wave (SAW) device like that described above in reference to FIGS. 4A-4B and 6A-6B. Advantageously, rather than projecting a constellation of a small number of dots/glints that sparsely sample the surface of the eye, the SAW device can project the interferometric structured light pattern onto the surface of the eye and thereby densely sample the eye's surface. For example, the structured light pattern that results from the interference of two or more diffracted beams generated by the SAW device may be a sinusoidal pattern of alternating bright-dark bars (i.e., interference fringes), examples of which are shown in FIGS. 8A-8F.

In step 1240, the acousto-optic device projects the interference pattern formed by the at least two interfering optical beams onto the surface of the eye. According to certain embodiments, any number of different optical structures can be employed to project the interference pattern. For example, the projection assembly 360 of FIG. 3 can be employed. Furthermore, FIGS. 4A-4B illustrate that the interference pattern can be out-coupled from the substrate of the SAW device without the need a separate out-coupling optical element, or the SAW device can employ one or more out-couplers, such as a prism, microlens, and the like as shown in FIGS. 6A-6B.

In step 1250, an imaging device captures one or more images of the interference pattern that is projected onto the surface of the eye. According to certain embodiments, the imaging device can be of the form of a digital camera with a suitable IR sensor (e.g., a complementary metal-oxide semiconductor (CMOS) or a charge-coupled device (CCD) sensor.

In step 1260, one or more processors compute a depth image of the eye based on the one or more images. According to certain embodiments, the processors can perform the process of fringe interferometry to compute a depth map of the image from a set of images of the eye as illuminated by interference patterns having differing phase and/or spatial frequency, as described above in reference to FIG. 9-11. The one or more processors can be any processors that can be operatively connected to any computer memory that are available within the system, e.g., processors associated with controller 315 of FIG. 3, the processors within the system described in FIG. 13 (e.g., within eye-tracking module 1318), or in FIG. 15.

One or more embodiments may include, or be implemented in conjunction with, an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 13:
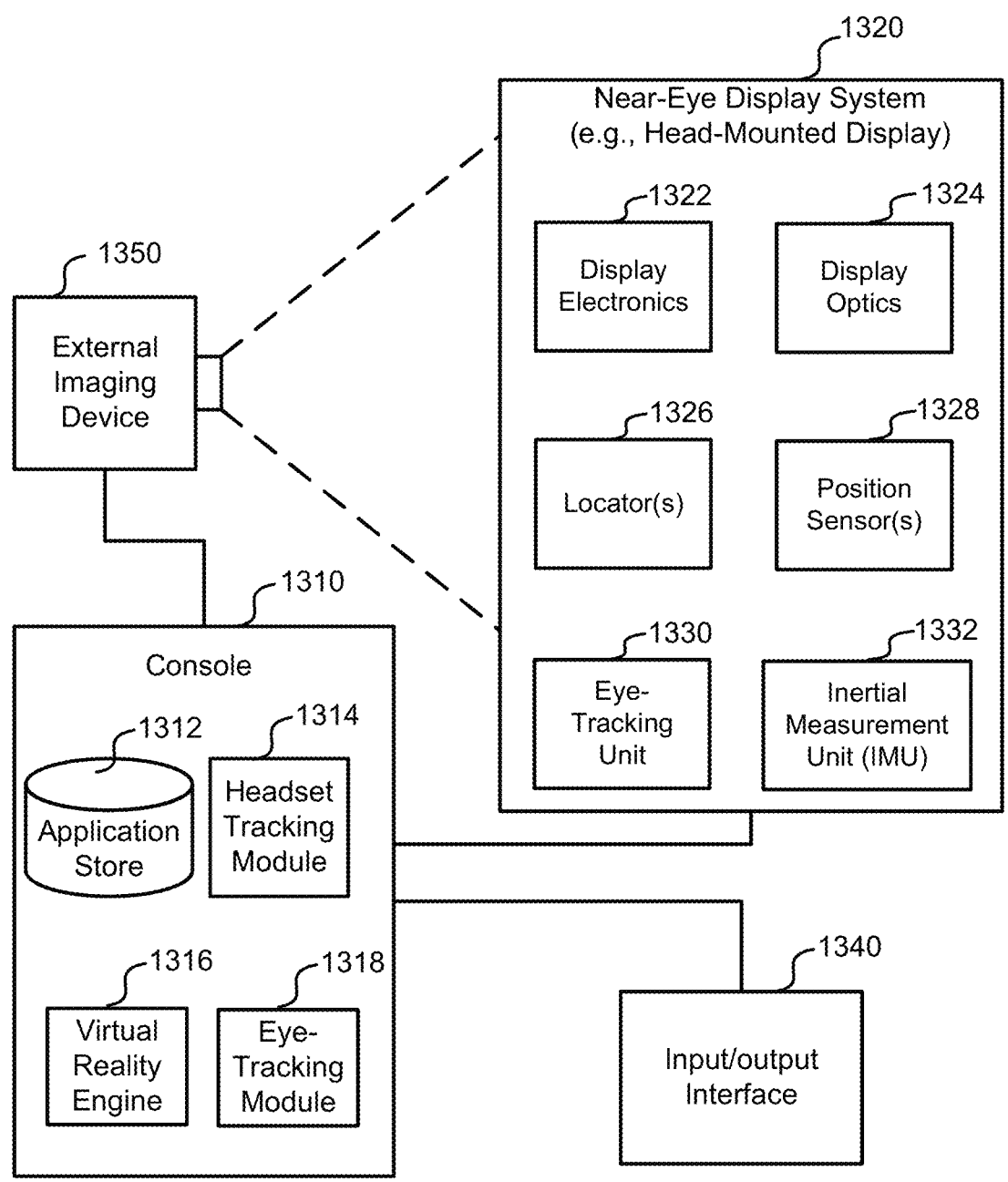
FIG. 13 is a simplified block diagram of an example of an artificial reality system environment including a near-eye display system in accordance with certain embodiments.

FIG. 13 is a simplified block diagram of an example artificial reality system environment 1300 including a near-eye display system 1320, in accordance with certain embodiments. Artificial reality system environment 1300 shown in FIG. 13 may include near-eye display system 1320, an external imaging device 1350, and an input/output interface 1340 that are each coupled to a console 1310. While FIG. 13 shows example artificial reality system environment 1300 including one near-eye display system 1320, one external imaging device 1350, and one input/output interface 1340, any number of these components may be included in artificial reality system environment 1300, or any of the components may be omitted. For example, there may be multiple near-eye displays 1320 monitored by one or more external imaging devices 1350 in communication with console 1310. In alternative configurations, different or additional components may be included in artificial reality system environment 1300.

Near-eye display system 1320 may be a head-mounted display that presents content to a user. Examples of content presented by near-eye display system 1320 include one or more of images, video, audio, or some combination thereof. In some embodiments, audio content may be presented via an external device (e.g., speakers and/or headphones) that receives audio information from near-eye display system 1320, console 1310, or both, and presents audio data based on the audio information. In various embodiments, near-eye display system 1320 may be implemented in any suitable form factor, including a pair of glasses. Some embodiments of near-eye display system 1320 are further described above in reference to FIGS. 2A-2B, 5, and 7. Additionally, in various embodiments, the functionality described herein may be used in a headset that combines images of an environment external to near-eye display system 1320 and content received from console 1310, or from any other console generating and providing content to a user. Therefore, near-eye display system 1320, and methods for eye-tracking described herein, may augment images of a physical, real-world environment external to near-eye display system 1320 with generated content (e.g., images, video, sound, etc.) to present an augmented reality to a user.

In various embodiments, near-eye display system 1320 may include one or more of display electronics 1322, display optics 1324, one or more locators 1326, one or more position sensors 1328, an eye-tracking unit 1330, and an inertial measurement unit (IMU) 1332. Near-eye display system 1320 may omit any of these elements or include additional elements in various embodiments. Additionally, in some embodiments, near-eye display system 1320 may include elements combining the function of various elements described in conjunction with FIG. 13.

Display electronics 1322 may display images to the user according to data received from console 1310. In various embodiments, display electronics 1322 may include one or more display panels that can be either opaque or transparent, such as a liquid crystal display (LCD), an organic light emitting diode (OLED) display, a micro light emitting diode (mLED) display, an active-matrix OLED display (AMO-LED), a transparent OLED display (TOLED), or some other display. For example, in one implementation of near-eye display system 1320, display electronics 1322 may include a front TOLED panel, a rear display panel, and an optical component (e.g., an attenuator, polarizer, or diffractive or spectral film) between the front and rear display panels. Display electronics 1322 may include sub-pixels to emit light of a predominant color such as red, green, blue, white, or yellow. In some implementations, display electronics 1322 may display a 3D image through stereo effects produced by two-dimensional panels to create a subjective perception of image depth. For example, display electronics 1322 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 1324 may display image content optically (e.g., using optical waveguides and couplers), or magnify image light received from display electronics 1322, correct optical errors associated with the image light, and present the corrected image light to a user of near-eye display system 1320. In various embodiments, display optics 1324 may include one or more optical elements. Example optical elements may include a substrate, optical waveguides, an aperture, a Fresnel lens, a convex lens, a concave lens, a filter, or any other suitable optical element that may affect image light emitted from display electronics 1322. Display optics 1324 may include a combination of different optical elements as well as mechanical couplings to maintain relative spacing and orientation of the optical elements in the combination. One or more optical elements in display optics 1324 may have an optical coating, such as an anti-reflective coating, a reflective coating, a filtering coating, or a combination of different optical coatings.

Magnification of the image light by display optics 1324 may allow display electronics 1322 to be physically smaller, weigh less, and consume less power than larger displays. Additionally, magnification may increase a field of view of the displayed content. In some embodiments, display optics 1324 may have an effective focal length larger than the spacing between display optics 1324 and display electronics 1322 to magnify image light projected by display electronics 1322. The amount of magnification of image light by display optics 1324 may be adjusted by adding or removing optical elements from display optics 1324.

Display optics 1324 may be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism. In some embodiments, content provided to display electronics 1322 for display may be pre-distorted, and display optics 1324 may correct the distortion when it receives image light from display electronics 1322 generated based on the pre-distorted content.

Locators 1326 may be objects located in specific positions on near-eye display system 1320 relative to one another and relative to a reference point on near-eye display system 1320. Console 1310 may identify locators 1326 in images captured by external imaging device 1350 to determine the artificial reality headset's position, orientation, or both. A locator 1326 may be a light emitting diode (LED), a corner cube reflector, a reflective marker, a type of light source that contrasts with an environment in which near-eye display system 1320 operates, or some combinations thereof. In embodiments where locators 1326 are active components (e.g., LEDs or other types of light emitting devices), locators 1326 may emit light in the visible band (e.g., about 380 nm to 750 nm), in the infrared (IR) band (e.g., 750 nm to about 2500 nm), in the ultraviolet band (e.g., about 10 nm to about 380 nm), in another portion of the electromagnetic spectrum, or in any combination of portions of the electromagnetic spectrum.

In some embodiments, locators 1326 may be located beneath an outer surface of near-eye display system 1320. A portion of near-eye display system 1320 between a locator 1326 and an entity external to near-eye display system 1320 (e.g., external imaging device 1350, a user viewing the outer surface of near-eye display system 1320) may be transparent to the wavelengths of light emitted or reflected by locators 1326 or is thin enough to not substantially attenuate the light emitted or reflected by locators 1326. In some embodiments, the outer surface or other portions of near-eye display system 1320 may be opaque in the visible band, but is transparent in the IR band, and locators 1326 may be under the outer surface and may emit light in the IR band.

External imaging device 1350 may generate slow calibration data based on calibration parameters received from console 1310. Slow calibration data may include one or more images showing observed positions of locators 1326 that are detectable by external imaging device 1350. External imaging device 1350 may include one or more cameras, one or more video cameras, any other device capable of capturing images including one or more of locators 1326, or some combinations thereof. Additionally, external imaging device 1350 may include one or more filters (e.g., to increase signal to noise ratio). External imaging device 1350 may be configured to detect light emitted or reflected from locators 1326 in a field of view of external imaging device 1350. In embodiments where locators 1326 include passive elements (e.g., retroreflectors), external imaging device 1350 may include a light source that illuminates some or all of locators 1326, which may retro-reflect the light to the light source in external imaging device 1350. Slow calibration data may be communicated from external imaging device 1350 to console 1310, and external imaging device 1350 may receive one or more calibration parameters from console 1310 to adjust one or more imaging parameters (e.g., focal length, focus, frame rate, sensor temperature, shutter speed, aperture, etc.).

Position sensors 1328 may generate one or more measurement signals in response to motion of near-eye display system 1320. Examples of position sensors 1328 may include accelerometers, gyroscopes, magnetometers, other motion-detecting or error-correcting sensors, or some combinations thereof. For example, in some embodiments, position sensors 1328 may include multiple accelerometers to measure translational acceleration (e.g., forward/back, up/down, or left/right) and multiple gyroscopes/accelerometers to measure orientation and/or rotational motion (e.g., pitch, yaw, or roll). In some embodiments, various position sensors may be oriented orthogonally to each other.

IMU 1332 may be an electronic device that generates fast calibration data based on measurement signals received from one or more of position sensors 1328. Position sensors 1328 may be located external to IMU 1332, internal to IMU 1332, or some combination thereof. Based on the one or more measurement signals from one or more position sensors 1328, IMU 1332 may generate fast calibration data indicating an estimated position of near-eye display system 1320 relative to an initial position of near-eye display system 1320. For example, IMU 1332 may integrate measurement signals received from accelerometers over time to estimate a velocity vector and integrate the velocity vector over time to determine an estimated position of a reference point on near-eye display system 1320. Alternatively, IMU 1332 may provide the sampled measurement signals to console 1310, which may determine the fast calibration data. While the reference point may generally be defined as a point in space, in various embodiments, the reference point may also be defined as a point within near-eye display system 1320 (e.g., a center of IMU 1332).

Eye-tracking unit 1330 may include one or more light sources, e.g., infra-red structured light generators like those described above, and imaging devices configured to capture eye-tracking data, which an eye-tracking module 1318 in console 1310 may use to track the user's eye. Eye-tracking data may refer to data output by eye-tracking unit 1330. Example eye-tracking data may include images captured by eye-tracking unit 1330 or information derived from the images captured by eye-tracking unit 1330, e.g., one or more depth images of the user's eyes. Eye-tracking may refer to determining an eye's position and gaze direction, including orientation and location of the eye, relative to near-eye display system 1320. For example, eye-tracking module 1318 may output the eye's pitch and yaw based on images of the eye captured by eye-tracking unit 1330. In various embodiments, eye-tracking unit 1330 may measure electromagnetic energy, e.g., in the form of a structured light pattern, reflected by the eye and communicate the measured electromagnetic energy to eye-tracking module 1318, which may then determine the eye's position based on the measured electromagnetic energy. For example, eye-tracking unit 1330 may measure electromagnetic waves such as visible light, infrared light, radio waves, microwaves, waves in any other part of the electromagnetic spectrum, or a combination thereof reflected by an eye of a user.

Eye-tracking unit 1330 may use low-power light emitters that emit light at frequencies and intensities that would not injure the eye or cause physical discomfort. Eye-tracking unit 1330 may be arranged to increase contrast in images of an eye captured by eye-tracking unit 1330 while reducing the overall power consumed by eye-tracking unit 1330 (e.g., reducing power consumed by a light emitter and an imaging system included in eye-tracking unit 1330). For example, in some implementations, eye-tracking unit 1330 may consume less than 100 milliwatts of power.

In some embodiments, eye-tracking unit 1330 may include one light emitter and one camera to track each of the user's eyes. Eye-tracking unit 1330 may also include different eye-tracking systems that operate together to provide improved eye-tracking accuracy and responsiveness. For example, eye-tracking unit 1330 may include a fast eye-tracking system with a fast response time and a slow eye-tracking system with a slower response time. The fast eye-tracking system may frequently measure an eye to capture data used by eye-tracking module 1318 to determine the eye's position relative to a reference eye position. The slow eye-tracking system may independently measure the eye to capture data used by eye-tracking module 1318 to determine the reference eye position without reference to a previously determined eye position. Data captured by the slow eye-tracking system may allow eye-tracking module 1318 to determine the reference eye position with greater accuracy than the eye's position determined from data captured by the fast eye-tracking system. In various embodiments, the slow eye-tracking system may provide eye-tracking data to eye-tracking module 1318 at a lower frequency than the fast eye-tracking system. For example, the slow eye-tracking system may operate less frequently or have a slower response time to conserve power.

Eye-tracking unit 1330 may be configured to estimate the orientation of the user's eye using, e.g., a fringe interferometry technique such as that described above in reference to FIGS. 9-11. The orientation of the eye may correspond to the direction of the user's gaze within near-eye display system 1320. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically. Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking unit 1330 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking unit may also be detected. Translation of this type may occur, for example, due to a shift in the position of near-eye display system 1320 on a user's head. Eye-tracking unit 1330 may also detect the torsion of the eye and the rotation of the eye about the pupillary axis. Eye-tracking unit 1330 may use the detected torsion of the eye to estimate the orientation of the foveal axis from the pupillary axis. Eye-tracking unit 1330 may also track a change in the shape of the eye, which may be approximated as a skew or scaling linear transform or a twisting distortion (e.g., due to torsional deformation). Eye-tracking unit 1330 may estimate the foveal axis based on some combinations of the angular orientation of the pupillary axis, the translation of the eye, the torsion of the eye, and the current shape of the eye.

Near-eye display system 1320 may use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking unit 1330 may be able to determine where the user is looking. For example, determining a direction of a user's gaze may include determining a point of convergence based on the determined orientations of the user's left and right eyes. A point of convergence may be the point where the two foveal axes of the user's eyes intersect (or the nearest point between the two axes). The direction of the user's gaze may be the direction of a line passing through the point of convergence and the mid-point between the pupils of the user's eyes.

Input/output interface 1340 may be a device that allows a user to send action requests to console 1310. An action request may be a request to perform a particular action. For example, an action request may be to start or to end an application or to perform a particular action within the application. Input/output interface 1340 may include one or more input devices. Example input devices may include a keyboard, a mouse, a game controller, a glove, a button, a touch screen, or any other suitable device for receiving action requests and communicating the received action requests to console 1310. An action request received by the input/output interface 1340 may be communicated to console 1310, which may perform an action corresponding to the requested action. In some embodiments, input/output interface 1340 may provide haptic feedback to the user in accordance with instructions received from console 1310. For example, input/output interface 1340 may provide haptic feedback when an action request is received, or when console 1310 has performed a requested action and communicates instructions to input/output interface 1340.

Console 1310 may provide content to near-eye display system 1320 for presentation to the user in accordance with information received from one or more of external imaging device 1350, near-eye display system 1320, and input/output interface 1340. In the example shown in FIG. 13, console 1310 may include an application store 1312, a headset tracking module 1314, a virtual reality engine 1316, and eye-tracking module 1318. Some embodiments of console 1310 may include different or additional modules than those described in conjunction with FIG. 1. Functions further described below may be distributed among components of console 1310 in a different manner than is described here.

In some embodiments, console 1310 and/or near-eye display system 13330 may include one or more processor(s) and a non-transitory computer-readable storage media for storing instructions executable by the processor(s). The processor(s) may each include multiple processing units executing instructions in parallel. The computer-readable storage media may be any memory, such as a hard disk drive, a removable memory, or a solid-state drive (e.g., flash memory or dynamic random access memory (DRAM)). In various embodiments, the modules of console 1310 described in conjunction with FIG. 1 may be encoded as instructions in the non-transitory computer-readable storage medium that, when executed by the processor, cause the processor to perform the functions further described below.

Application store 1312 may store one or more applications for execution by console 1310. An application may include a group of instructions that, when executed by a processor, generates content for presentation to the user. Content generated by an application may be in response to inputs received from the user via movement of the user's eyes or inputs received from the input/output interface 1340. Examples of the applications may include gaming applications, conferencing applications, video playback application, or other suitable applications.

Headset tracking module 1314 may track movements of near-eye display system 1320 using slow calibration information from external imaging device 1350. For example, headset tracking module 1314 may determine positions of a reference point of near-eye display system 1320 using observed locators from the slow calibration information and a model of near-eye display system 1320. Headset tracking module 1314 may also determine positions of a reference point of near-eye display system 1320 using position information from the fast calibration information. Additionally, in some embodiments, headset tracking module 1314 may use portions of the fast calibration information, the slow calibration information, or some combination thereof, to predict a future location of near-eye display system 1320. Headset tracking module 1314 may provide the estimated or predicted future position of near-eye display system 1320 to VR engine 1316.

Headset tracking module 1314 may calibrate the artificial reality system environment 1300 using one or more calibration parameters, and may adjust one or more calibration parameters to reduce errors in determining the position of near-eye display system 1320. For example, headset tracking module 1314 may adjust the focus of external imaging device 1350 to obtain a more accurate position for observed locators on near-eye display system 1320. Moreover, calibration performed by headset tracking module 1314 may also account for information received from IMU 1332. Additionally, if tracking of near-eye display system 1320 is lost (e.g., external imaging device 1350 loses line of sight of at least a threshold number of locators 1326), headset tracking module 1314 may re-calibrate some or all of the calibration parameters.

VR engine 1316 may execute applications within artificial reality system environment 1300 and receive position information of near-eye display system 1320, acceleration information of near-eye display system 1320, velocity information of near-eye display system 1320, predicted future positions of near-eye display system 1320, or some combination thereof from headset tracking module 1314. VR engine 1316 may also receive estimated eye position and orientation information from eye-tracking module 1318. Based on the received information, VR engine 1316 may determine content to provide to near-eye display system 1320 for presentation to the user. For example, if the received information indicates that the user has looked to the left, VR engine 1316 may generate content for near-eye display system 1320 that mirrors the user's eye movement in a virtual environment. Additionally, VR engine 1316 may perform an action within an application executing on console 1310 in response to an action request received from input/output interface 1340, and provide feedback to the user indicating that the action has been performed. The feedback may be visual or audible feedback via near-eye display system 1320 or haptic feedback via input/output interface 1340.

While FIG. 13 shows eye-tracking module 1318 as part of console 1310, in some embodiments it may be fully or partially integrated into the near-eye display system 1320. In some embodiments, eye-tracking module 1318 may receive eye-tracking data from eye-tracking unit 1330 and determine the position of the user's eye based on the eye-tracking data. The position of the eye may include an eye's orientation, location, or both relative to near-eye display system 1320 or any element thereof. Because the eye's axes of rotation change as a function of the eye's location in its socket, determining the eye's location in its socket may allow eye-tracking module 1318 to more accurately determine the eye's orientation.

In some embodiments, eye-tracking unit 1330 may output eye-tracking data including images of the eye, and eye-tracking module 1318 may determine the eye's position based on the images. For example, eye-tracking module 1318 may store a mapping between images captured by eye-tracking unit 1330 and eye positions to determine a reference eye position from an image captured by eye-tracking unit 1330. Alternatively or additionally, eye-tracking module 1318 may determine an updated eye position relative to a reference eye position by comparing an image from which the reference eye position is determined to an image from which the updated eye position is to be determined. Eye-tracking module 1318 may determine eye position using measurements from different imaging devices or other sensors. For example, as described above, eye-tracking module 1318 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 1318 may also determine eye calibration parameters to improve precision and accuracy of eye-tracking. Eye calibration parameters may include parameters that may change whenever a user dons or adjusts near-eye display system 1320. Example eye calibration parameters may include an estimated distance between a component of eye-tracking unit 1330 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 1320 may reach the eye (as in some augmented reality applications), the calibration parameters may include correction factors for intensity and color balance due to variations in light from the outside of near-eye display system 1320. Eye-tracking module 1318 may use eye calibration parameters to determine whether the measurements captured by eye-tracking unit 1330 would allow eye-tracking module 1318 to determine an accurate eye position (also referred to herein as "valid measurements"). Invalid measurements, from which eye-tracking module 1318 may not be able to determine an accurate eye position, may be caused by the user blinking, adjusting the headset, or removing the headset, and/or may be caused by near-eye display system 1320 experiencing greater than a threshold change in illumination due to external light.

Figure 14:
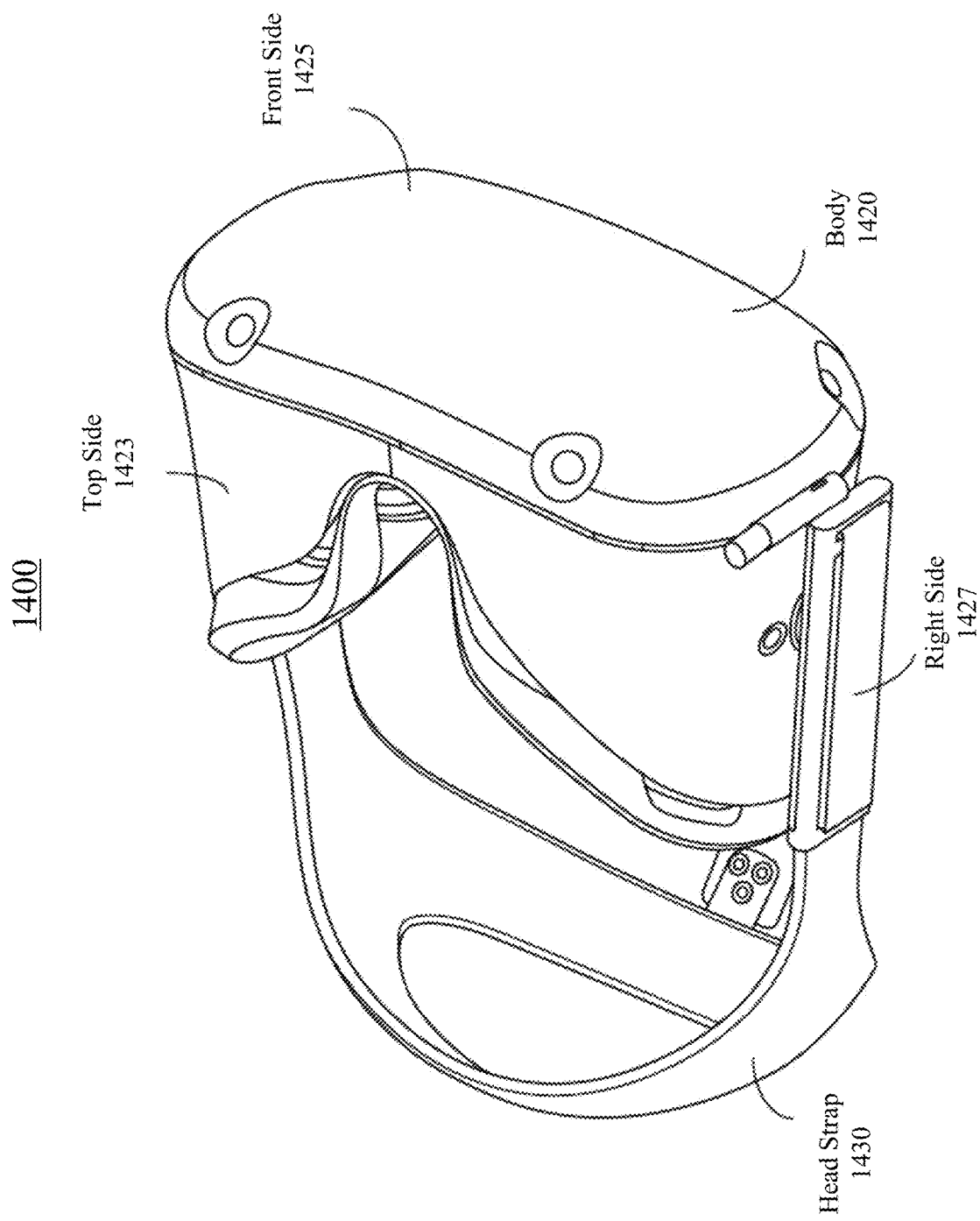
FIG. 14 is a perspective view of an example of a near-eye display in the form of a head-mounted display device in accordance with certain embodiments.

FIG. 14 is a perspective view of an example near-eye display in the form of a head-mounted display (HMD) device 1400 according to certain embodiments. HMD device 14100 may be a part of, e.g., a virtual reality (VR) system, an augmented reality (AR) system, a mixed reality (MR) system, or some combinations thereof. HMD device 1400 may include a body 1420 and a head strap 1430. FIG. 14 shows a top side 1423, a front side 1425, and a right side 1427 of body 1420 in the perspective view. Head strap 1430 may have an adjustable or extendible length. There may be a sufficient space between body 1420 and head strap 1430 of HMD device 1400 for allowing a user to mount HMD device 1400 onto the user's head. In various embodiments, HMD device 1400 may include additional, fewer, or different components. For example, in some embodiments, HMD device 1400 may include eyeglass temples and temples tips as shown in, for example, FIGS. 2A-2B, rather than head strap 1430.

HMD device 1400 may present to a user media including virtual and/or augmented views of a physical, real-world environment with computer-generated elements. Examples of the media presented by HMD device 1400 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 14) enclosed in body 1420 of HMD device 1400. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 1400 may include two eye box regions.

In some implementations, HMD device 1400 may include various sensors (not shown), such as depth sensors, motion sensors, position sensors, and eye-tracking sensors. Some of these sensors may use a structured light pattern for sensing. In some implementations, HMD device 1400 may include an input/output interface for communicating with a console. In some implementations, HMD device 1400 may include a virtual reality engine (not shown) that can execute applications within HMD device 1400 and receive depth information, position information, acceleration information, velocity information, predicted future positions, or some combination thereof of HMD device 1400 from the various sensors. In some implementations, the information received by the virtual reality engine may be used for producing a signal (e.g., display instructions) to the one or more display assemblies. In some implementations, HMD device 1400 may include locators (not shown, such as locators 1326) located in fixed positions on body 1420 relative to one another and relative to a reference point. Each of the locators may emit light that is detectable by an external imaging device.

Figure 15:
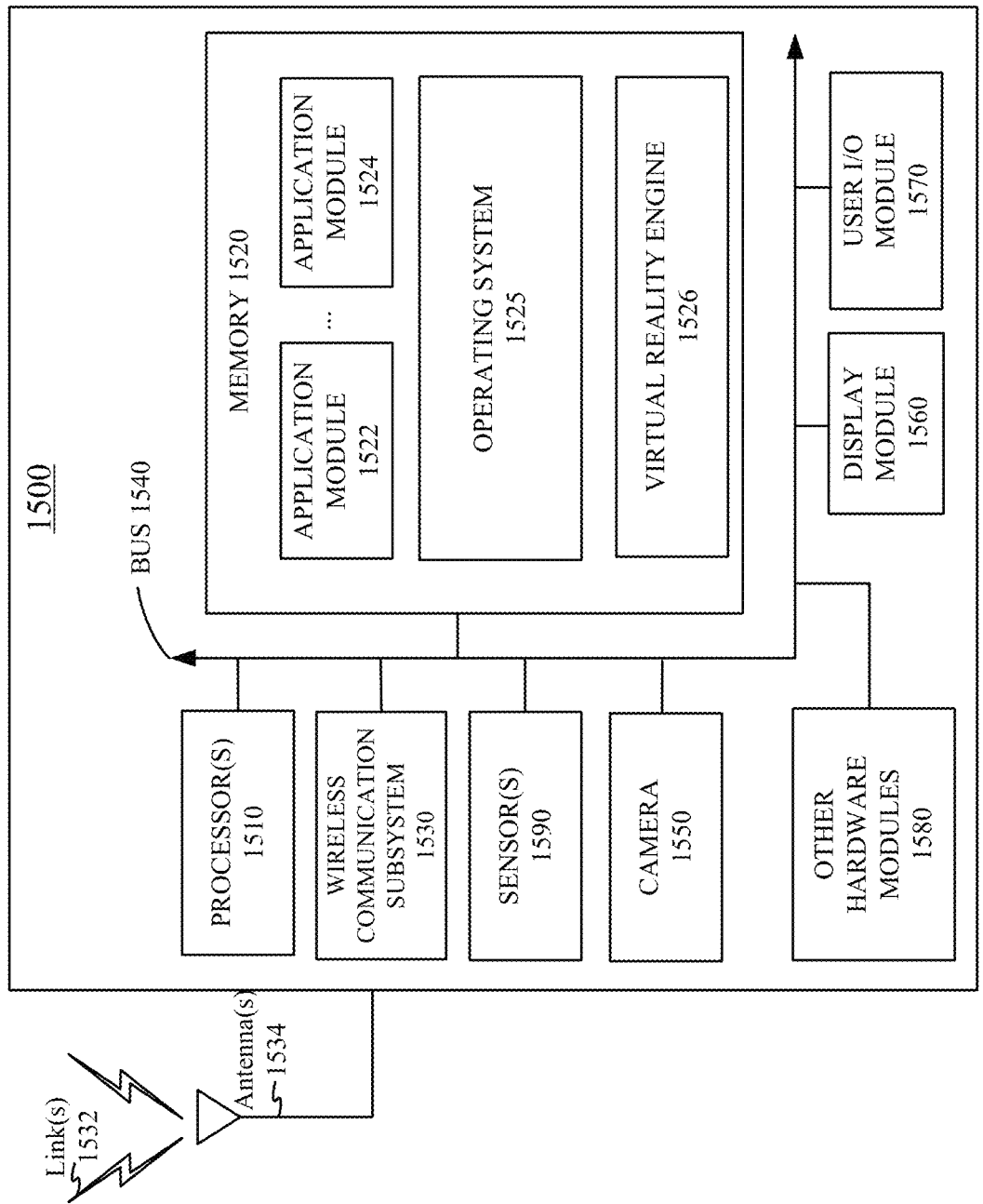
FIG. 15 is a simplified block diagram of an example of an electronic system of a near-eye display according to certain embodiments.

FIG. 15 is a simplified block diagram of an example electronic system 1500 of an example near-eye display (e.g., HMD device) according to certain embodiments. Electronic system 1500 may be used as the electronic system of HMD device 1400 or other near-eye display described above. In this example, electronic system 1500 may include one or more processor(s) 1510 and a memory 1520. Processor(s) 1510 may be configured to execute instructions for performing operations at a number of components, and can be, for example, a general-purpose processor or microprocessor suitable for implementation within a portable electronic device. Processor(s) 1510 may be communicatively coupled with a plurality of components within electronic system 1500. To realize this communicative coupling, processor(s) 1510 may communicate with the other illustrated components across a bus 1540. Bus 1540 may be any subsystem adapted to transfer data within electronic system 1500. Bus 1540 may include a plurality of computer buses and additional circuitry to transfer data.

Memory 1520 may be coupled to processor(s) 1510. In some embodiments, memory 1520 may offer both short-term and long-term storage and may be divided into several units. Memory 1520 may be volatile, such as static random access memory (SRAM) and/or dynamic random access memory (DRAM) and/or non-volatile, such as read-only memory (ROM), flash memory, and the like. Furthermore, memory 1520 may include removable storage devices, such as secure digital (SD) cards. Memory 1520 may provide storage of computer-readable instructions, data structures, program modules, and other data for electronic system 1500. In some embodiments, memory 1520 may be distributed into different hardware modules. A set of instructions and/or code might be stored on memory 1520. The instructions might take the form of executable code that may be executable by electronic system 1500, and/or might take the form of source and/or installable code, which, upon compilation and/or installation on electronic system 1500 (e.g., using any of a variety of generally available compilers, installation programs, compression/decompression utilities, etc.), may take the form of executable code.

In some embodiments, memory 1520 may store a plurality of application modules 1522 through 1524, which may include any number of applications. Examples of applications may include gaming applications, conferencing applications, video playback applications, or other suitable applications. The applications may include a depth sensing function or eye-tracking function. Application modules 1522-1524 may include particular instructions to be executed by processor(s) 1510. In some embodiments, certain applications or parts of application modules 1522-1524 may be executable by other hardware modules 1580. In certain embodiments, memory 1520 may additionally include secure memory, which may include additional security controls to prevent copying or other unauthorized access to secure information.

In some embodiments, memory 1520 may include an operating system 1525 loaded therein. Operating system 1525 may be operable to initiate the execution of the instructions provided by application modules 1522-1524 and/or manage other hardware modules 1580 as well as interfaces with a wireless communication subsystem 1530 which may include one or more wireless transceivers. Operating system 1525 may be adapted to perform other operations across the components of electronic system 1500 including threading, resource management, data storage control and other similar functionality.

Wireless communication subsystem 1530 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1500 may include one or more antennas 1534 for wireless communication as part of wireless communication subsystem 1530 or as a separate component coupled to any portion of the system. Depending on desired functionality, wireless communication subsystem 1530 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1530 may permit data to be exchanged with a network, other computer systems, and/or any other devices described herein. Wireless communication subsystem 1530 may include a means for transmitting or receiving data, such as identifiers of HMD devices, position data, a geographic map, a heat map, photos, or videos, using antenna(s) 1534 and wireless link(s) 1532. Wireless communication subsystem 1530, processor(s) 1510, and memory 1520 may together comprise at least a part of one or more of a means for performing some functions disclosed herein.

Embodiments of electronic system 1500 may also include one or more sensors 1590. Sensor(s) 1590 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1590 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensor may use a structured light pattern for sensing.

Electronic system 1500 may include a display module 1560. Display module 1560 may be a near-eye display, and may graphically present information, such as images, videos, and various instructions, from electronic system 1500 to a user. Such information may be derived from one or more application modules 1522-1524, virtual reality engine 1526, one or more other hardware modules 1580, a combination thereof, or any other suitable means for resolving graphical content for the user (e.g., by operating system 1525). Display module 1560 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1500 may include a user input/output module 1570. User input/output module 1570 may allow a user to send action requests to electronic system 1500. An action request may be a request to perform a particular action. For example, an action request may be to start or end an application or to perform a particular action within the application. User input/output module 1570 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1500. In some embodiments, user input/output module 1570 may provide haptic feedback to the user in accordance with instructions received from electronic system 1500. For example, the haptic feedback may be provided when an action request is received or has been performed.

Electronic system 1500 may include a camera 1550 that may be used to take photos or videos of a user, for example, for tracking the user's eye position. Camera 1550 may also be used to take photos or videos of the environment, for example, for VR, AR, or MR applications. Camera 1550 may include, for example, a complementary metal-oxide-semiconductor (CMOS) image sensor with a few millions or tens of millions of pixels. In some implementations, camera 1550 may include two or more cameras that may be used to capture 3-D images.

In some embodiments, electronic system 1500 may include a plurality of other hardware modules 1580. Each of other hardware modules 1580 may be a physical module within electronic system 1500. While each of other hardware modules 1580 may be permanently configured as a structure, some of other hardware modules 1580 may be temporarily configured to perform specific functions or temporarily activated. Examples of other hardware modules 1580 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1580 may be implemented in software.

In some embodiments, memory 1520 of electronic system 1500 may also store a virtual reality engine 1526. Virtual reality engine 1526 may execute applications within electronic system 1500 and receive position information, acceleration information, velocity information, predicted future positions, or some combination thereof of the HMD device from the various sensors. In some embodiments, the information received by virtual reality engine 1526 may be used for producing a signal (e.g., display instructions) to display module 1560. For example, if the received information indicates that the user has looked to the left, virtual reality engine 1526 may generate content for the HMD device that mirrors the user's movement in a virtual environment. Additionally, virtual reality engine 1526 may perform an action within an application in response to an action request received from user input/output module 1570 and provide feedback to the user. The provided feedback may be visual, audible, or haptic feedback. In some implementations, processor(s) 1510 may include one or more GPUs that may execute virtual reality engine 1526.

In various implementations, the above-described hardware and modules may be implemented on a single device or on multiple devices that can communicate with one another using wired or wireless connections. For example, in some implementations, some components or modules, such as GPUs, virtual reality engine 1526, and applications (e.g., tracking application), may be implemented on a console separate from the head-mounted display device. In some implementations, one console may be connected to or support more than one HMD.

In alternative configurations, different and/or additional components may be included in electronic system 1500. Similarly, functionality of one or more of the components can be distributed among the components in a manner different from the manner described above. For example, in some embodiments, electronic system 1500 may be modified to include other system environments, such as an AR system environment and/or an MR environment.

In the description and figures disclosed herein, specific details are set forth for the purposes of explanation and in order to provide a thorough understanding of examples of the disclosure. However, it will be apparent that various examples may be practiced without these specific details.

For example, devices, systems, structures, assemblies, methods, and other components may be shown as components in block diagram form in order not to obscure the examples with unnecessary detail. As such, the figures and description are not intended to be restrictive or limiting. The terms and expressions that have been employed in this disclosure are used as terms of description and not of limitation, and there is no intention in the use of such terms and expressions of excluding any equivalents of the features shown and described or portions thereof.

Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A system comprising:
a display having a light emitting surface configured to emit display light in a visible spectrum toward an eye of a user;
a light source configured to emit a light beam outside the visible spectrum; and
an acousto-optic device coupled to the display, disposed in a field of view of the eye of the user, and transparent to the display light in the visible spectrum, the acousto-optic device configured to:
transmit the display light in the visible spectrum from the display without diffracting the display light,
diffract the light beam outside the visible spectrum into at least two interfering light beams, and
project an interference pattern formed by the at least two interfering light beams onto a surface of the eye of the user for eye tracking.

2. The system of claim 1, further comprising a camera configured to capture one or more images of the interference pattern that is projected onto the surface of the eye.

3. The system of claim 2, further comprising one or more processors configured to determine a depth image of the eye based on the one or more images.

4. The system of claim 1, wherein the acousto-optic device that is configured to diffract the light beam outside the visible spectrum into the at least two interfering light beams is a surface acoustic wave (SAW) device.

5. The system of claim 4, wherein the SAW device is a layered device comprising:
a waveguide layer that guides and diffracts the light beam; and
a substrate layer, wherein the waveguide layer is disposed on the substrate layer.

6. The system of claim 5, wherein the SAW device further comprises a transducer that is acoustically coupled to the waveguide layer, wherein, in response to a drive signal, an acoustic wave from the transducer generates a dynamic diffraction grating that diffracts the light beam into the at least two interfering light beams.

7. The system of claim 6, wherein an interface between the waveguide layer and the substrate layer is configured to reflect the at least two interfering light beams before the at least two interfering light beams are projected onto the surface of the eye of the user.

8. The system of claim 6, wherein an interface between the waveguide layer and the substrate layer is configured to transmit the at least two interfering light beams before the at least two interfering light beams are projected onto the surface of the eye of the user.

9. The system of claim 1, further comprising a controller including a processor and configured to:
generate a drive signal that, at least in part, determines at least one of a phase or a frequency of the interference pattern; and
provide the drive signal to the acousto-optic device.

10. The system of claim 1, wherein the light emitting surface is a transparent display disposed in front of the eye of the user.

11. The system of claim 10, wherein the acousto-optic device is disposed on the transparent display within the field of view of the eye of the user.

12. The system of claim 1, wherein the light emitting surface is an opaque display disposed in front of the eye of the user.

13. The system of claim 12, wherein the acousto-optic device is disposed on the opaque display that is disposed within the field of view of the eye of the user.

14. A method comprising:
emitting, from a display, display light in a visible spectrum toward an eye of a user;
emitting, by a light source, a light beam outside the visible spectrum for eye tracking;
generating, by an acousto-optic device coupled to the display, disposed in a field of view of the eye of the user, and transparent to the display light in the visible spectrum, structured light from the light beam by diffracting the light beam outside the visible spectrum into at least two interfering light beams, wherein the acousto-optic device is configured to transmit the display light in the visible spectrum from the display without diffracting the display light; and
projecting, by the acousto-optic device, an interference pattern formed by the at least two interfering light beams onto a surface of the eye.

15. The method of claim 14, further comprising capturing, by a camera, one or more images of the interference pattern that is projected onto the surface of the eye.

16. The method of claim 15, further comprising determining, by one or more processors, a depth image of the eye based on the one or more images.

17. The method of claim 14, wherein the acousto-optic device is a surface acoustic wave (SAW) device.

18. The method of claim 17, wherein the SAW device is a layered device comprising:
a waveguide layer that guides and diffracts the light beam; and
a substrate layer, wherein the waveguide layer is disposed on the substrate layer.

19. The method of claim 18, further comprising:
generating, from a transducer that is acoustically coupled to the waveguide layer, an acoustic wave that generates a dynamic diffraction grating that diffracts the light beam into the at least two interfering light beams.

20. A system comprising:
a means for emitting display light in a visible spectrum toward an eye of a user; and
a means for emitting a light beam outside the visible spectrum for eye tracking;
a means for acousto-optically generating structured light from the light beam by diffracting the light beam outside the visible spectrum into at least two interfering light beams, wherein the means for acousto-optically generating the structured light is coupled to the means for emitting display light, is disposed in a field of view of the eye of the user, and is configured to transmit the display light in the visible spectrum without diffracting the display light; and
a means for projecting an interference pattern formed by the at least two interfering light beams onto a surface of the eye.

* * * * *